US009262699B2

(12) United States Patent
Barman et al.

(10) Patent No.: US 9,262,699 B2
(45) Date of Patent: Feb. 16, 2016

(54) METHOD OF HANDLING COMPLEX VARIANTS OF WORDS THROUGH PREFIX-TREE BASED DECODING FOR DEVANAGIRI OCR

(71) Applicant: QUALCOMM Incorporated, San Diego, CA (US)

(72) Inventors: Kishor K. Barman, Bangalore (IN); Pawan Kumar Baheti, Bangalore (IN); Raj Kumar Krishna Kumar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 13/828,060

(22) Filed: Mar. 14, 2013

(65) Prior Publication Data

US 2014/0023274 A1      Jan. 23, 2014

Related U.S. Application Data

(60) Provisional application No. 61/677,291, filed on Jul. 30, 2012, provisional application No. 61/673,606, filed on Jul. 19, 2012.

(51) Int. Cl.
*G06K 9/62* (2006.01)
*G06K 9/78* (2006.01)
(Continued)

(52) U.S. Cl.
CPC ........ *G06K 9/78* (2013.01); *G06K 9/344* (2013.01); *G06K 9/723* (2013.01); *G06K 2209/01* (2013.01); *G06K 2209/013* (2013.01)

(58) Field of Classification Search
None
See application file for complete search history.

(56) References Cited

U.S. PATENT DOCUMENTS

| 3,710,321 A | 1/1973 | Rubenstein |
| 4,654,875 A | 3/1987 | Srihari et al. |

(Continued)

FOREIGN PATENT DOCUMENTS

| EP | 1146478 A2 | 10/2001 |
| EP | 1840798 A1 | 10/2007 |

(Continued)

OTHER PUBLICATIONS

Setlur, et al. "Creation of data resources and design of an evaluation test bed for Devanagari script recognition", Research Issues in Data Engineering: Multi-lingual Information Management, RIDE-MLIM 2003. Proceedings. 13th International Workshop, 2003, pp. 55-61.

(Continued)

*Primary Examiner* — Brian P Werner
(74) *Attorney, Agent, or Firm* — Silicon Valley Patent Group LLP

(57) ABSTRACT

An electronic device and method identify a block of text in a portion of an image of real world captured by a camera of a mobile device, slice sub-blocks from the block and identify characters in the sub-blocks that form a first sequence to a predetermined set of sequences to identify a second sequence therein. The second sequence may be identified as recognized (as a modifier-absent word) when not associated with additional information. When the second sequence is associated with additional information, a check is made on pixels in the image, based on a test specified in the additional information. When the test is satisfied, a copy of the second sequence in combination with the modifier is identified as recognized (as a modifier-present word). Storage and use of modifier information in addition to a set of sequences of characters enables recognition of words with or without modifiers.

29 Claims, 12 Drawing Sheets

(51) Int. Cl.
*G06K 9/72* (2006.01)
*G06K 9/34* (2006.01)

(56) References Cited

U.S. PATENT DOCUMENTS

| | | | |
|---|---|---|---|
| 5,321,768 A | 6/1994 | Fenrich et al. |
| 5,459,739 A | 10/1995 | Handley et al. |
| 5,465,304 A | 11/1995 | Cullen et al. |
| 5,519,786 A | 5/1996 | Courtney et al. |
| 5,563,403 A | 10/1996 | Bessho et al. |
| 5,633,954 A | 5/1997 | Gupta et al. |
| 5,751,850 A | 5/1998 | Rindtorff |
| 5,764,799 A | 6/1998 | Hong et al. |
| 5,768,451 A | 6/1998 | Hisamitsu et al. |
| 5,805,747 A | 9/1998 | Bradford |
| 5,835,633 A | 11/1998 | Fujisaki et al. |
| 5,844,991 A | 12/1998 | Hochberg et al. |
| 5,978,443 A | 11/1999 | Patel |
| 6,023,536 A | 2/2000 | Visser |
| 6,092,045 A | 7/2000 | Stubley et al. |
| 6,266,439 B1 | 7/2001 | Pollard et al. |
| 6,393,443 B1 | 5/2002 | Rubin et al. |
| 6,473,517 B1 | 10/2002 | Tyan et al. |
| 6,674,919 B1 | 1/2004 | Ma et al. |
| 6,678,415 B1 | 1/2004 | Popat et al. |
| 6,687,421 B1 | 2/2004 | Navon |
| 6,738,512 B1 | 5/2004 | Chen et al. |
| 6,954,795 B2 | 10/2005 | Takao et al. |
| 7,031,530 B2 | 4/2006 | Driggs et al. |
| 7,110,621 B1 | 9/2006 | Greene et al. |
| 7,142,727 B2 | 11/2006 | Notovitz et al. |
| 7,263,223 B2 | 8/2007 | Irwin |
| 7,333,676 B2 | 2/2008 | Myers et al. |
| 7,403,661 B2 | 7/2008 | Curry et al. |
| 7,450,268 B2 | 11/2008 | Martinez et al. |
| 7,724,957 B2 | 5/2010 | Abdulkader |
| 7,738,706 B2 | 6/2010 | Aradhye et al. |
| 7,783,117 B2 | 8/2010 | Liu et al. |
| 7,817,855 B2 | 10/2010 | Yuille et al. |
| 7,889,948 B2 | 2/2011 | Steedly et al. |
| 7,961,948 B2 | 6/2011 | Katsuyama |
| 7,984,076 B2 | 7/2011 | Kobayashi et al. |
| 8,005,294 B2 | 8/2011 | Kundu et al. |
| 8,009,928 B1 | 8/2011 | Manmatha et al. |
| 8,189,961 B2 | 5/2012 | Nijemcevic et al. |
| 8,194,983 B2 | 6/2012 | Al-Omari et al. |
| 8,285,082 B2 | 10/2012 | Heck |
| 8,306,325 B2 | 11/2012 | Chang |
| 8,417,059 B2 | 4/2013 | Yamada |
| 8,542,926 B2 | 9/2013 | Panjwani et al. |
| 8,644,646 B2 | 2/2014 | Heck |
| 2002/0037104 A1 | 3/2002 | Myers et al. |
| 2003/0026482 A1 | 2/2003 | Dance |
| 2003/0099395 A1 | 5/2003 | Wang et al. |
| 2003/0215137 A1 | 11/2003 | Wnek |
| 2004/0179734 A1 | 9/2004 | Okubo |
| 2004/0240737 A1 | 12/2004 | Lim et al. |
| 2005/0041121 A1 | 2/2005 | Steinberg et al. |
| 2005/0123199 A1 | 6/2005 | Mayzlin et al. |
| 2005/0238252 A1 | 10/2005 | Prakash et al. |
| 2006/0039605 A1 | 2/2006 | Koga |
| 2006/0215231 A1 | 9/2006 | Borrey et al. |
| 2006/0291692 A1 | 12/2006 | Nakao et al. |
| 2007/0116360 A1 | 5/2007 | Jung et al. |
| 2007/0217676 A1 | 9/2007 | Grauman et al. |
| 2008/0008386 A1 | 1/2008 | Anisimovich et al. |
| 2008/0063273 A1 | 3/2008 | Shimodaira |
| 2008/0112614 A1 | 5/2008 | Fluck et al. |
| 2009/0060335 A1 | 3/2009 | Rodriguez et al. |
| 2009/0202152 A1 | 8/2009 | Takebe et al. |
| 2009/0232358 A1 | 9/2009 | Cross |
| 2009/0252437 A1 | 10/2009 | Li et al. |
| 2009/0316991 A1 | 12/2009 | Geva et al. |
| 2009/0317003 A1 | 12/2009 | Heilper et al. |
| 2010/0049711 A1 | 2/2010 | Singh et al. |
| 2010/0067826 A1 | 3/2010 | Honsinger et al. |
| 2010/0080462 A1 | 4/2010 | Miljanic et al. |
| 2010/0128131 A1 | 5/2010 | Tenchio et al. |
| 2010/0141788 A1 | 6/2010 | Hwang et al. |
| 2010/0144291 A1 | 6/2010 | Stylianou et al. |
| 2010/0172575 A1 | 7/2010 | Lukac et al. |
| 2010/0195933 A1 | 8/2010 | Nafarieh |
| 2010/0232697 A1 | 9/2010 | Mishima et al. |
| 2010/0239123 A1 | 9/2010 | Funayama et al. |
| 2010/0245870 A1 | 9/2010 | Shibata |
| 2010/0272361 A1 | 10/2010 | Khorsheed et al. |
| 2010/0296729 A1 | 11/2010 | Mossakowski |
| 2011/0052094 A1 | 3/2011 | Gao et al. |
| 2011/0081083 A1 | 4/2011 | Lee et al. |
| 2011/0188756 A1 | 8/2011 | Lee et al. |
| 2011/0215147 A1 | 9/2011 | Goncalves et al. |
| 2011/0222768 A1 | 9/2011 | Galic et al. |
| 2011/0249897 A1 | 10/2011 | Chaki et al. |
| 2011/0274354 A1 | 11/2011 | Nijemcevic |
| 2011/0280484 A1 | 11/2011 | Ma et al. |
| 2011/0285873 A1 | 11/2011 | Showering et al. |
| 2012/0051642 A1 | 3/2012 | Berrani et al. |
| 2012/0066213 A1 | 3/2012 | Ohguro |
| 2012/0092329 A1 | 4/2012 | Koo et al. |
| 2012/0114245 A1 | 5/2012 | Lakshmanan et al. |
| 2012/0155754 A1 | 6/2012 | Chen et al. |
| 2013/0001295 A1 | 1/2013 | Goncalves |
| 2013/0058575 A1 | 3/2013 | Koo et al. |
| 2013/0129216 A1 | 5/2013 | Tsai et al. |
| 2013/0194448 A1 | 8/2013 | Baheti et al. |
| 2013/0195315 A1 | 8/2013 | Baheti et al. |
| 2013/0195360 A1 | 8/2013 | Krishna Kumar et al. |
| 2013/0195376 A1 | 8/2013 | Baheti et al. |
| 2013/0308860 A1 | 11/2013 | Mainali et al. |
| 2014/0003709 A1 | 1/2014 | Ranganathan et al. |
| 2014/0022406 A1 | 1/2014 | Baheti et al. |
| 2014/0023270 A1 | 1/2014 | Baheti et al. |
| 2014/0023271 A1 | 1/2014 | Baheti et al. |
| 2014/0023273 A1 | 1/2014 | Baheti et al. |
| 2014/0023275 A1 | 1/2014 | Krishna Kumar et al. |
| 2014/0023278 A1 | 1/2014 | Krishna Kumar et al. |
| 2014/0161365 A1 | 6/2014 | Acharya |
| 2014/0168478 A1 | 6/2014 | Baheti et al. |

FOREIGN PATENT DOCUMENTS

| | | |
|---|---|---|
| EP | 2192527 A1 | 6/2010 |
| GB | 2453366 A | 4/2009 |
| GB | 2468589 A | 9/2010 |
| WO | 2004077358 A1 | 9/2004 |

OTHER PUBLICATIONS

Li, et al. "Automatic Text Detection and Tracking in a Digital Video", IEEE Transactions on Image Processing, Jan. 2000, pp. 147-156, vol. 9, No. 1.

Chen, et al. "Detecting and reading text in natural scenes," IEEE Computer Society Conference on Computer Vision and Pattern Recognition (CVPR'04), 2004, pp. 1-8.

Lee, et al. "A new methodology for gray-scale character segmentation and recognition," IEEE Transactions on Pattern Analysis and Machine Intelligence, Oct. 1996, pp. 1045-1050, vol. 18, No. 10.

Epshtein, et al. "Detecting text in natural scenes with stroke width transform," Computer Vision and Pattern Recognition (CVPR) 2010, pp. 2963-2970, (as downloaded from "http://research.microsoft.com/pubs/149305/1509.pdf").

Jain, et al. "Automatic text location in images and video frames", Pattern Recognition, 1998, pp. 2055-2076, vol. 31, No. 12.

Matas, et al. "Robust Wide Baseline Stereo from Maximally Stable Extremal Regions", Proc. Of British Machine Vision Conference, 2002, pp. 384-393.

Shin et al. "Application of Floyd-Warshall Labelling Technique: Identification of Connected Pixel Components in Binary Image", published in Kangweon-Kyungki Math. Jour. 14 (2006), No. 1, pp. 47-55.

Park et al. "Fast Connected Component Labeling Algorithm Using A Divide and Conquer Technique", believed to be published in Matrix

(56) References Cited

OTHER PUBLICATIONS (2000), vol. 4, Issue: 1, Publisher: Elsevier Ltd, pp. 4-7.
"4.1 Points and patches" In: Szeliski Richard: "Computer Vision—Algorithms and Applications", 2011, Springer-Verlag, London, XP002696110, p. 195, ISBN: 978-1-84882-934-3.
Agrawal, et al., "Generalization of Hindi OCR Using Adaptive Segmentation and Font Files," V. Govindaraju, S. Setlur (eds.), Guide to OCR for Indic Scripts, Advances in Pattern Recognition, DOI 10.1007/978-1-84800-330-9_10, Springer-Verlag London Limited 2009, pp. 181-207.
Agrawal M., et al., "2 Base Devanagari OCR System" In: Govindaraju V, Srirangataj S (Eds.): "Guide to OCR for Indic Scripts—Document Recognition and Retrieval", 2009, Springer Science+Business Media, London, XP002696109, pp. 184-193, ISBN: 978-1-84888-329-3.
Chaudhuri et al., "Skew Angle Detection of Digitized Indian Script Documents", IEEE Transactions on Pattern Analysis and Machine Intelligence, Feb. 1997, pp. 182-186, vol. 19, No. 2.
Chen H., et al., "Robust Text Detection In Natural Images With Edge-Enhanced Maximally Stable Extremal Regions," believed to be published in IEEE International Conference on Image Processing (ICIP), Sep. 2011, pp. 1-4.
Chowdhury A.R., et al., "Text Detection of Two Major Indian Scripts in Natural Scene Images", Sep. 22, 2011 (Sep. 2, 2011), Camera-Based Document Analysis and Recognition, Springer Berlin Heidelberg, pp. 42-57, XP019175802, ISBN: 978-3-642-29363-4.
Dlagnekov L., et al., "Detecting and Reading Text In Natural Scenes," Oct. 2004, pp. 1-22.
Elgammal A.M., et al., "Techniques for Language Identification for Hybrid Arabic-English Document Images," believed to be published in 2001 in Proceedings of IEEE 6th International Conference on Document Analysis and Recognition, pp. 1-5.
Ghoshal R., et al., "Headline Based Text Extraction from Outdoor Images", 4th International Conference on Pattern Recognition and Machine Intelligence, Springer LNCS, vol. 6744, Jun. 27, 2011, pp. 446-451, XP055060285.
Holmstrom L., et al., "Neural and Statistical Classifiers—Taxonomy and Two Case Studies," IEEE Transactions on Neural Networks, Jan. 1997, pp. 5-17, vol. 8 (1).
Jain A.K., et al., "Automatic Text Location in Images and Video Frames," believed to be published In Proceedings of Fourteenth International Conference on Pattern Recognition, vol. 2, Aug. 1998, pp. 1497-1499.
Jayadevan, et al., "Offline Recognition of Devanagari Script: A Survey", IEEE Transactions on Systems, Man, and Cybernetics—Part C: Applications and Reviews, 2010, pp. 1-15.
Kapoor et al., "Skew angle detection of a cursive handwritten Devanagari script character image", Indian Institute of Science, May-Aug. 2002, pp. 161-175.
Machine Learning, retrieved from http://en.wikipedia.org/wiki/Machine_learning, May 7, 2012, pp. 1-8.
Mikulik, et al., "Construction of Precise Local Affine Frames," Center for Machine Perception, Czech Technical University in Prague, Czech Republic, pp. 1-5, Abstract and second paragraph of Section 1; Algorithms 1 & 2 of Section 2 and Section 4, International Conference on Pattern Recognition, 2010, pp. 1-5.
Moving Average, retrieved from http://en.wikipedia.org/wiki/Moving_average, Jan. 23, 2013, pp. 1-5.
Nister D., et al., "Linear Time Maximally Stable Extremal Regions," ECCV, 2008, Part II, LNCS 5303, pp. 183-196, published by Springer-Verlag Berlin Heidelberg.
Pal, et al., "Indian script character recognition: a survey", Pattern Recognition Society, Published by Elsevier Ltd, 2004, pp. 1887-1899.
Papandreou A. et al., "A Novel Skew Detection Technique Based on Vertical Projections", International Conference on Document Analysis and Recognition, Sep. 18, 2011, pp. 384-388, XP055062043, DOI: 10.1109/ICDAR.2011.85, ISBN: 978-1-45-771350-7.

Pardo M., et al., "Learning From Data: A Tutorial With Emphasis on Modern Pattern Recognition Methods," IEEE Sensors Journal, Jun. 2002, pp. 203-217, vol. 2 (3).
Renold M., "Detecting and Reading Text in Natural Scenes," Master's Thesis, May 2008, pp. 1-59.
Vedaldi A., "An Implementation of Multi-Dimensional Maximally Stable Extremal Regions" Feb. 7, 2007, pp. 1-7.
VLFeat—Tutorials—MSER, retrieved from http://www.vlfeat.org/overview/mser.html, Apr. 30, 2012, pp. 1-2.
Chaudhuri B., Ed., "Digital Document Processing—Major Directions and Recent Advances", 2007, Springer-Verlag London Limited, XP002715747, ISBN : 978-1-84628-501-1 pp. 103-106, p. 106, section "5.3.5 Zone Separation and Character Segmentation", paragraph 1.
Chaudhuri B.B., et al., "An OCR system to read two Indian language scripts: Bangla and Devnagari (Hindi)", Proceedings of the 4th International Conference on Document Analysis and Recognition. (ICDAR). Ulm, Germany, Aug. 18-20, 1997; [Proceedings of the ICDAR], Los Alamitos, IEEE Comp. Soc, US, vol. 2, Aug. 18, 1997, pp. 1011-1015, XP010244882, DOI: 10.1109/ICDAR.1997.620662 ISBN: 978-0-8186-7898-1 the whole document.
Chaudhury S (Eds.): "OCR Technical Report for the project Development of Robust Document Analysis and Recognition System for Printed Indian Scripts", 2008, pp. 149-153, XP002712777, Retrieved from the Internet: URL:http://researchweb.iiit.ac.inj-jinesh/ocrDesignDoc.pdf [retrieved on Sep. 5, 2013].
Chen Y.L., "A knowledge-based approach for textual information extraction from mixed text/graphics complex document images", Systems Man and Cybernetics (SMC), 2010 IEEE International Conference on, IEEE, Piscataway, NJ, USA, Oct. 10, 2010, pp. 3270-3277, XP031806156, ISBN: 978-1-4244-6586-6.
Dalal N., et al., "Histograms of oriented gradients for human detection", Computer Vision and Pattern Recognition, 2005 IEEE Computer Society Conference on, IEEE, Piscataway, NJ, USA, Jun. 25, 2005, pp. 886-893 vol. 1, XP031330347, ISBN: 978-0-7695-2372-9 Section 6.3.
Forssen P.E., et al., "Shape Descriptors for Maximally Stable Extremal Regions", Computer Vision, 2007. ICCV 2007. IEEE 11th International Conference on, IEEE, PI, Oct. 1, 2007, pp. 1-8, XP031194514 , ISBN: 978-1-4244-1630-1 abstract Section 2. Multi-resoltuion MSER.
International Search Report and Written Opinion—PCT/US2013/048830—ISA/EPO—Oct. 18, 2013.
Minoru M., Ed., "Character Recognition", Aug. 2010, Sciyo, XP002715748, ISBN: 978-953-307-105-3 pp. 91-95, p. 92, secton "7.3 Baseline Detection Process".
Pal U et al., "Multi-skew detection of Indian script documents" Document Analysis and Recognition, 2001. Proceedings. Sixth International Conference on Seattle, WA, USA Sep. 10-13, 2001, Los Aalmitos, CA, USA, IEEE Comput. Soc. US, Sep. 10, 2001, pp. 292-296, XP010560519, DOI:10.1109/ICDAR.2001.953801, ISBN: 978-0-7695-1263-1.
Pal U., et al., "OCR in Bangla: an Indo-Bangladeshi language", Pattern Recognition, 1994. vol. 2—Conference B: Computer Vision & Image Processing., Proceedings of the 12th IAPR International. Conferenc E on Jerusalem, Israel Oct. 9-13, 1994, Los Alamitos, CA, USA, IEEE Comput. Soc, vol. 2, Oct. 9, 1994, pp. 269-273, XP010216292, DOI: 10.1109/ICPR.1994.576917 ISBN: 978-0-8186-6270-6 the whole document.
Premaratne H.L., et al., "Lexicon and hidden Markov model-based optimisation of the recognised Sinhala script", Pattern Recognition Letters, Elsevier, Amsterdam, NL, vol. 27, No. 6, Apr. 15, 2006, pp. 696-705, XP027922538, ISSN: 0167-8655.
Ray A.K et al., "Information Technology—Principles and Applications". 2004. Prentice-Hall of India Private Limited. New Delhi! XP002712579, ISBN: 81-203-2184-7, pp. 529-531.
Senda S., et al., "Fast String Searching in a Character Lattice," IEICE Transactions on Information and Systems, Information & Systems Society, Tokyo, JP, vol. E77-D, No. 7, Jul. 1, 1994, pp. 846-851, XP000445299, ISSN: 0916-8532.
Senk V., et al., "A new bidirectional algorithm for decoding trellis codes," Eurocon' 2001, Trends in Communications, International Conference on Jul. 4-7, 2001, Piscataway, NJ, USA, IEEE, Jul. 4,

(56) References Cited

OTHER PUBLICATIONS 2001, pp. 34-36, vol. I, XP032155513, DOI :10.1109/EURCON. 2001.937757 ISBN : 978-0-7803-6490-5.

Sinha R.M.K., et al., "On Devanagari document processing", Systems, Man and Cybernetics, 1995. Intelligent Systems for the 21stT Century., IEEE International Conference on Vancouver, BC, Canada Oct. 22-25, 1995, New York, NY, USA,IEEE, US, vol. 2, Oct. 22, 1995, pp. 1621-1626, XP010194509, DOI: 10.1109/ICSMC.1995. 538004 ISBN: 978-0-7803-2559-3 the whole document.

Song Y., et al., "A Handwritten Character Extraction Algorithm for Multi-language Document Image", 2011 International Conference on Document Analysis and Recognition, Sep. 18, 2011, pp. 93-98, XP055068675, DOI: 10.1109/ICDAR.2011.28 ISBN: 978-1-45-771350-7.

Uchida S et al., "Skew Estimation by Instances", 2008 The Eighth IAPR International Workshop on Document Analysis Systems, Sep. 1, 2008, pp. 201-208, XP055078375, DOI: 10.1109/DAS.2008.22, ISBN: 978-0-76-953337-7.

Unser M., "Sum and Difference Histograms for Texture Classification", Transactions on Pattern Analysis and Machine Intelligence, IEEE, Piscataway, USA, vol. 30, No. 1, Jan. 1, 1986, pp. 118-125, XP011242912, ISSN: 0162-8828 section A; p. 122, right-hand column p. 123.

Wu V., et al., "TextFinder: An Automatic System to Detect and Recognize Text In Images", IEEE Transactions on Pattern Analysis and Machine Intelligence, vol. 21. No. 11, Nov. 1, 1999, pp. 1224-1229, XP055068381.

Lowe, D.G., "Distinctive Image Features from Scale-Invariant Keypoints," International Journal of Computer Vision, Jan. 5, 2004, 28 pp.

Newell, A.J., et al.,"Multiscale histogram of oriented gradient descriptors for robust character recognition", 2011 International Conference on Document Analysis and Recognition (ICDAR), IEEE, 2011, 5 pp.

Wikipedia, "Connected-Component Labeling," retrieved from http://en.wikipedia.org/wiki/Connected-component_labeling on May 14, 2012, date believed to be prior to Mar. 14, 2013, 7 pages.

Wikipedia, "Histogram of Oriented Gradients," retrieved from http://en.wikipedia.org/wiki/Histogram_of_oriented_gradients on Apr. 30, 2015, date believed to be prior to Mar. 14, 2013, 7 pages.

Kristensen, F., et al., "Real-Time Extraction of Maximally Stable Extremal Regions on an FPGA," IEEE International Symposium on Circuits and Systems 2007 (ISCAS 2007), New Orleans, LA, May 27-30, 2007, pp. 165-168.

Bansal, et al., "Partitioning and Searching Dictionary for Correction of Optically Read Devanagari Character Strings," International Journal on Document Analysis and Recognition manuscript, IJDAR 4(4): 269-280 (2002).

Kompalli, et al., "Devanagari OCR using a recognition driven segmentation framework and stochastic language models," IJDAR (2009) 12, pp. 123-138.

Lehal, et al., "Feature Extraction and Classification for OCR of Gurmukhi Script," Journal of Vivek, 12, pp. 2-12, 1999.

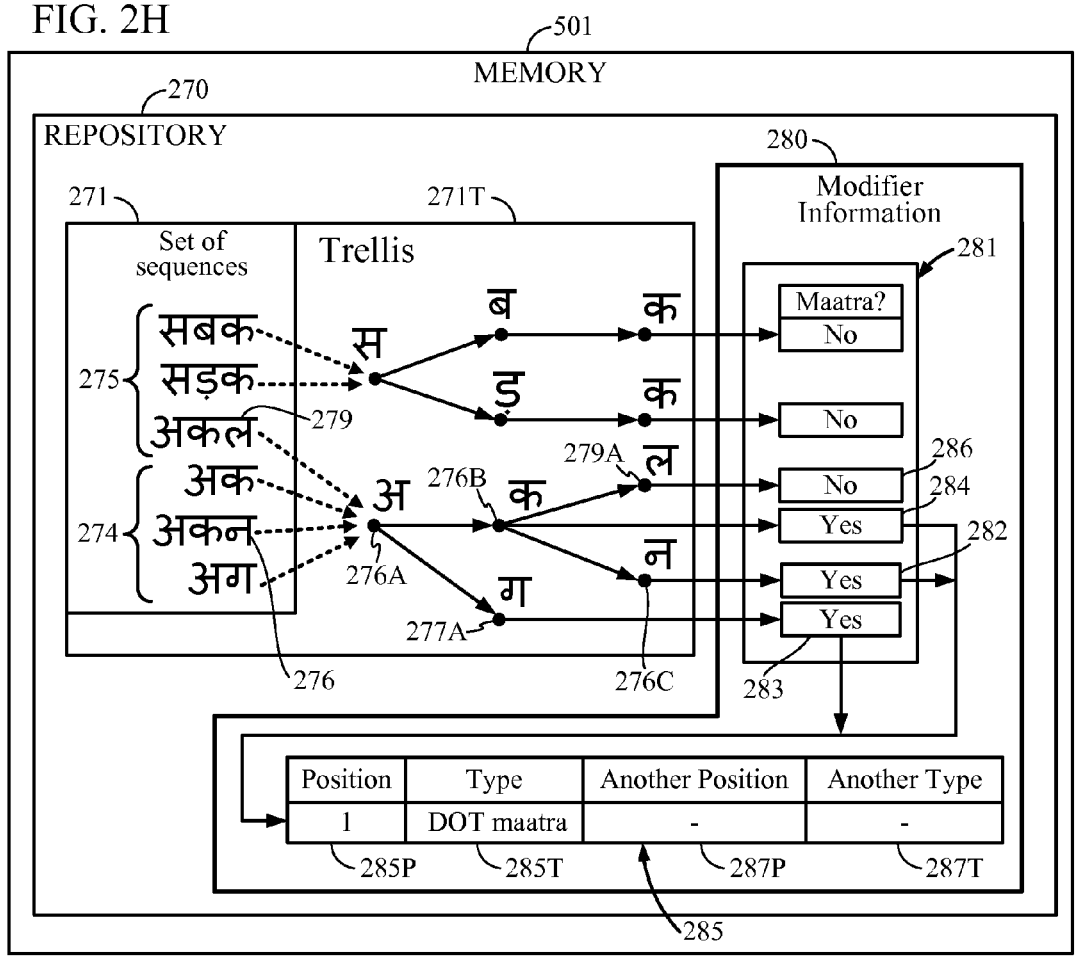

FIG. 2J (prior art)
291
FIG. 2K
| Position | Type |
|---|---|
| 3 | ChandraBindu |
291P      291T
FIG. 2L (prior art)
292
FIG. 2M
| Position | Type |
|---|---|
| 1 | Chandra |
292P      292T

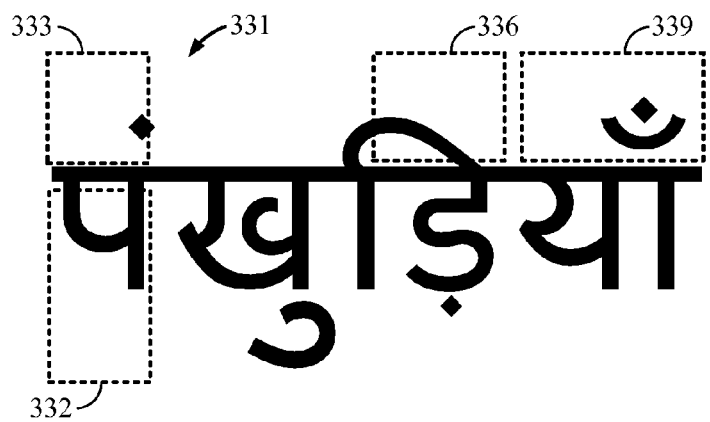
FIG. 3C
FIG. 3D
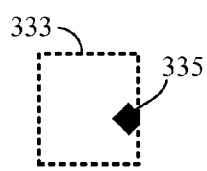
FIG. 3E
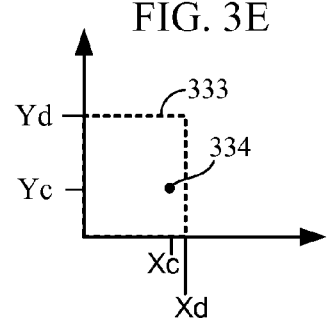
FIG. 3F
FIG. 3G
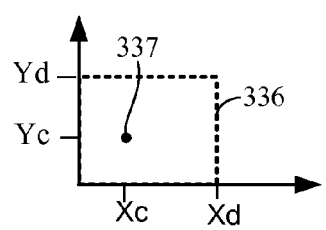
FIG. 3H
FIG. 3I
FIG. 3J
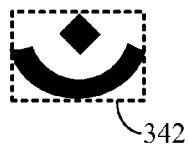
FIG. 3K

METHOD OF HANDLING COMPLEX VARIANTS OF WORDS THROUGH PREFIX-TREE BASED DECODING FOR DEVANAGIRI OCR

CROSS-REFERENCE TO PROVISIONAL APPLICATIONS

This application claims priority under 35 USC §119 (e) from U.S. Provisional Application No. 61/677,291 filed on Jul. 30, 2012 and entitled "Method Of Handling Complex Variants Of Words Through Prefix-Tree Based Decoding For Devanagiri OCR", which is assigned to the assignee hereof and which is incorporated herein by reference in its entirety.

This application claims priority under 35 USC §119 (e) from U.S. Provisional Application No. 61/673,606 filed on Jul. 19, 2012 and entitled "Trellis based word decoder with reverse pass", which is assigned to the assignee hereof and which is incorporated herein by reference in its entirety.

CROSS-REFERENCE TO US APPLICATION INCORPORATED BY REFERENCE

This application is related to U.S. application Ser. No. 13/829,960, filed concurrently herewith, entitled "Trellis based word decoder with reverse pass" which is assigned to the assignee hereof and which is incorporated herein by reference in its entirety.

FIELD

This patent application relates to devices and methods for identifying in natural images or video frames, words of text.

BACKGROUND

Identification of text regions in papers that are optically scanned (e.g. by a flatbed scanner of a photocopier) is significantly easier (e.g. due to upright orientation, large size and slow speed) than detecting regions that may contain text in scenes of the real world that may be captured in images (also called "natural images") or in video frames in real time by a handheld device (such as a smartphone) having a built-in digital camera. Specifically, optical character recognition (OCR) methods of the prior art originate in the field of document processing, wherein the document image contains a series of lines of text (e.g. 30 lines of text) of an optically scanned page in a document.

Document processing techniques, although successfully used on scanned documents created by optical scanners, generate too many false positives and/or negatives so as to be impractical when used on natural images containing text. Hence, detection of text regions in a real world image generated by a handheld camera is performed using different techniques. For additional information on techniques used in the prior art, to identify text regions in natural images, see the following articles that are incorporated by reference herein in their entirety as background:

(a) LI, et al. "Automatic Text Detection and Tracking in a Digital Video", IEEE Transactions on Image Processing, January 2000, pages 147-156, Volume 9, No. 1;

(b) CHEN, et al. "Detecting and reading text in natural scenes," IEEE Computer Society Conference on Computer Vision and Pattern Recognition (CVPR'04), 2004, pages 1-8;

(c) LEE, et al. "A new methodology for gray-scale character segmentation and recognition," IEEE Transactions on Pattern Analysis and Machine Intelligence, October 1996, pp. 1045-1050, vol. 18, no. 10;

(d) EPSHTEIN, et al. "Detecting text in natural scenes with stroke width transform," Computer Vision and Pattern Recognition (CVPR) 2010, pages 2963-2970, (as downloaded from "http://research.microsoft.com/pubs/149305/1509.pdf"); and (e) JAIN, et al. "Automatic text location in images and video frames", Pattern Recognition, 1998, pp. 2055-2076, Vol. 31, No. 12.

Image processing techniques of the prior art described above appear to be developed primarily to identify regions in images that contain text which is written in the language English. Use of such techniques to identify in natural images, regions of text in other languages that use different scripts for letters of their alphabets can result in false positives and/or negatives so as to render the techniques impractical.

FIG. 1 illustrates a newspaper in the real world scene 100 in India. A user 110 (see FIG. 1) may use a camera-equipped mobile device (such as a cellular phone) 108 to capture an image 107 (also called "natural image" or "real world image") of scene 100. Camera captured image 107 may be displayed on a screen 106 (FIG. 1) of mobile device 108. Such an image 107 (FIG. 1), if processed directly using prior art image processing techniques may result in failure to recognize one or more words in a region 103 (see FIG. 1). Specifically, use of prior art methods can cause problems when used with words that have modifiers, such as a dot located on top of a word, e.g. DOT maatra ○ expressed in a language, such as Hindi that uses the Devanagari script.

Depending on variations in lighting, color, tilt, focus, font etc, pixels that constitute a dot may or may not be included in a rectangular portion of the image that is being processed by OCR. The dot is just one of over ten (10) accent marks that may be used in the language Hindi. Moreover, presence of different fonts in addition to the large number of letters (including conjunct consonants) of the alphabet in Devanagari requires an OCR decoder to recognize a very large number of characters, resulting in a very complex system with poor recall accuracy.

Accordingly, there is a need to improve identification of words formed by Devanagari (also spelled Devanagiri) characters in a natural image or video frame, as described below.

SUMMARY

In several aspects of described embodiments, an electronic device and method use a repository stored on one or more non-transitory computer readable storage media to perform optical character recognition (OCR) on text in an image received from a camera. The repository of several embodiments stores information on modifiers (e.g. accent marks) that is separated from information (e.g. feature vectors) normally used to recognize characters of a word in a predetermined natural language, such as Hindi. A modifier is not a character (such as a consonant) in the script of the natural language, and instead the modifier is a mark (e.g. a dot) which when present modifies a specific character, as per rules of the predetermined language (e.g. rules related to modification or accentuation of characters, by use of modifiers thereon).

In several embodiments, information on a word, in which a modifier occurs in normal usage of the word, in the predetermined natural language is stored in a repository by subdivision (or disassembly or disintegration) of the word (called "modifier-present" word) into (1) information on a primitive which includes a sequence of characters (also called "primitive word" or "prefix") and (2) information on one or more modifier(s) that when present, combine with one or more character(s) in the sequence to form the word. In addition to storing information on modifier-present words, the repository of several embodiments further stores information on words wherein no modifier occurs in normal usage of the word (called "modifier-absent" words), as a sequence of characters with no associated modifier.

One or more processors coupled to the one or more non-transitory computer readable storage media are programmed to use the repository to detect in a camera-captured image at least one text region including a first sequence of characters Specifically, the one or more processors select a second sequence of characters (e.g. by use of a sequence of feature vectors corresponding to the second sequence of characters) from a predetermined set of sequences in the repository (as matching the first sequence of characters). Moreover, the one or more processors are programmed to analyze the image to determine whether at least one pixel satisfies a test associated with a modifier that modifies a specific character in the sequence, if the second sequence is associated with additional information (also called "modifier information", "side information", or "predetermined information") based on one or more tests. When the test is satisfied, the one or more processors add a specific modifier to a specific character in a copy of the second sequence, followed by identifying the first sequence detected in the text region as the copy of the second sequence with the modifier.

In several embodiments, the electronic device and method initially identify a rectangle of text (also called "block") in a portion of an image of real world captured by a camera of a mobile device, slice the block into sub-blocks, and identify at least one character in each sub-block. The device and method then select a specific sequence of characters, from a predetermined set of sequences (which set includes sequences of modifier-absent words and sequences of modifier-present words) by matching the specific sequence being selected to characters identified in the block. The device and method then check whether the specific sequence is associated with additional information, and if not the specific word is marked as recognized (as a modifier-absent word).

When a specific sequence that is identified from a block in the image happens to be a primitive word, the device and method automatically retrieve from the repository additional information which indicates that one or more modifiers associated with the primitive word (e.g. as indicated by a flag) need to be checked for presence in the image. Hence the device and method of some embodiments then check if any modifier(s) is/are present in the image (e.g. by checking intensities of pixels above the block) and if so the primitive word and the modifier(s) are together identified in combination with one another, as being recognized (as a modifier-present word).

Depending on the embodiment, the additional information in the repository may identify, for a specific sequence, a predetermined position relative to the rectangle (e.g. located above a specific character in the sequence) at which a group of pixels need to be present in the image, to be recognized as a predetermined modifier. Such information may additionally or alternatively identify other properties of the group of pixels to be checked, such as an expected size (e.g. at least $\frac{1}{5}^{th}$ of the size of the rectangle) and/or an expected shape (such as an aspect ratio between 0.9 and 1.1). Hence, after identification of a sequence of characters, additional information in the repository is used to check the image for presence of a group of pixels (e.g. in the form of a modifier of a primitive word or prefix) and then it is a combination of the sequence and the modifier that is recognized as a word of text occurring in the image.

It is to be understood that several other aspects of the invention will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIG. 2H illustrates a repository 270 in memory 501 used in some embodiments, to perform one or more acts in operation 230 of FIG. 2A.

FIG. 2I illustrates a table 290 in memory 501 with a row therein used in some embodiments, to initialize input parameters of an MSER method performed in act 211 of operation 210 of FIG. 2A.

FIGS. 2J and 2L illustrate prior art images of two words in the language Hindi, written in the script Devanagari.

FIGS. 2K and 2M illustrate data structures of side information used in some embodiments to identify the positions of modifiers ChandraBindu and Chandra in the words of FIGS. 2J and 2L.

FIG. 3C illustrates a sub-block 332 to be subject to recognition in some embodiments, as a character in an image 331 of a word in the language Hindi, written in the script Devanagari.

FIG. 3D illustrates region 333 of image 331 in FIG. 3C that is extracted in some embodiments and subject to recognition as a modifier.

FIG. 3E illustrates, in a graph, a point 334 which is identified in some embodiments to be a center of mass of (or a center of area) of pixels of text in the region 333 of FIG. 3D.

FIG. 3F illustrates region 336 of image 331 in FIG. 3C that is subject to recognition as a modifier in some embodiments.

FIG. 3G illustrates, in a graph, a point 337 which represents a center of mass that is identified in some embodiments for the region 336 of FIG. 3F.

FIG. 3H illustrates region 339 of image 331 in FIG. 3C that is subject to recognition as a modifier in some embodiments.

FIG. 3I illustrates a bounding box 341 formed around all of the pixels of text (e.g. all black pixels) in region 339 of FIG. 3H in some embodiments.

FIG. 3J illustrates a re-sized image that is prepared in some embodiments for identification by correlation with pre-stored ChandraBindu template images.

FIG. 3K illustrates a region 343 including pixels of text in the form of a Chandra maatra 292 that is recognized as a modifier in some embodiments.

DETAILED DESCRIPTION

Several operations and acts of the type described herein are implemented by one or more processors included in a mobile device 401 (FIG. 6) that is capable of identifying regions (e.g. using MSER) in rectangular blocks of an image of a real world scene, followed by segmentation of each block to form sub-blocks and identify characters therein. Hence, mobile device 401 may include a camera 405 (FIG. 6) to generate a still image or a frame of a video, of a scene in the real world (also called "natural image"). Depending on the embodiment of mobile device 401, camera 405 may be a digital camera or a video camera.

Mobile device 401 may further include sensors, such as accelerometers, gyroscopes, GPS sensor or the like, which may be used to assist in determining various attributes, such as a pose (including position and orientation) of mobile device 401 relative to a real world scene captured by camera 405. Those of skill in the art will appreciate that the techniques described herein can be adapted to identify portions of an image having a shape other than a rectangle, and to identify characters therein. In the following description, a single processor (such as processor 404) is sometimes described for convenience, although it is to be understood that multiple processors may be used, depending on the embodiment.

Figure 6:
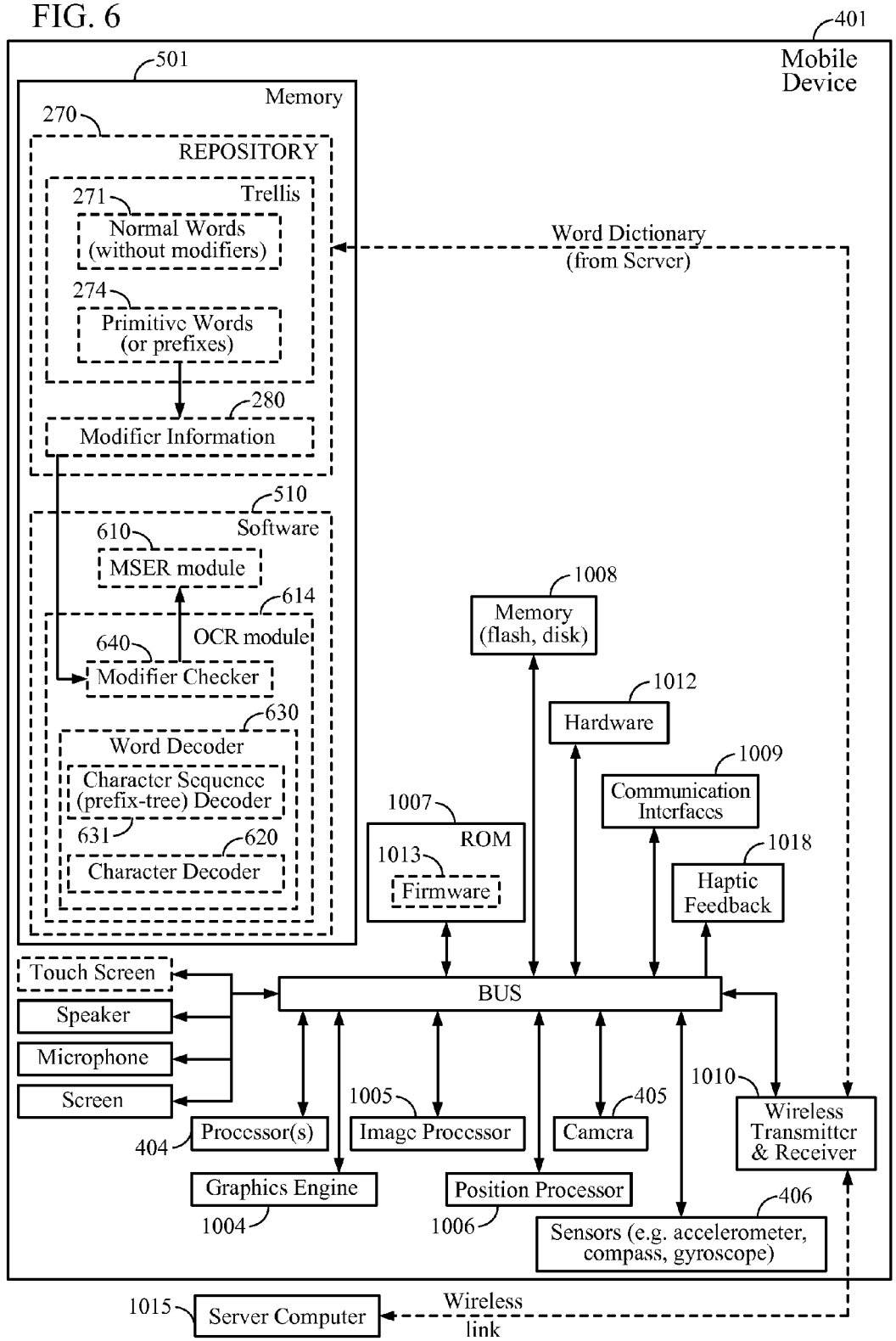
FIG. 6 illustrates, in a high-level block diagram, various components of a handheld device in some of the described embodiments.

Accordingly, in several embodiments of the type described herein, in an act 201 (FIG. 2A), one or more processor(s) receive an image of a scene from camera 405. Hence, at least one processor, such as processor 404 (e.g. included in a mobile device 401 as illustrated in FIG. 6) may be programmed in some embodiments to process the image at multiple levels of abstraction, e.g. pixel level processing in operation 210 which is lower than character level processing in operation 220 which in turn is lower than word level processing in operation 230. During processing at a higher level of abstraction, e.g. word level processing in operation 230 (FIG. 2A), processor 404 may be programmed to jump to performing operations at (or using information created at) a lower level of abstraction, e.g. perform pixel level processing in operation 240 (or use information from character level processing in operation 220) and then return back to the higher level of abstraction.

Hence, processor 404 may be programmed to perform word level processing in operation 230 to identify a sequence of characters during recognition of a word, thereafter jump to a lower level of abstraction by performing pixel level processing in operation 240 e.g. to confirm the occurrence of pixels in a specific pattern in the image or to re-do one or more pixel level operations in a selected portion of the image, and thereafter return to continue performing word level processing again in operation 230, to complete recognition of a word which includes the specific sequence of characters. In one example, after a specific sequence of characters is identified, processor 404 is programmed to check an image for pixels that may form a DOT maatra ़ in the Devanagari script of a character in the specific sequence of characters, followed by identifying the word (as a combination of the specific sequence and DOT maatra).

Figure 2A:
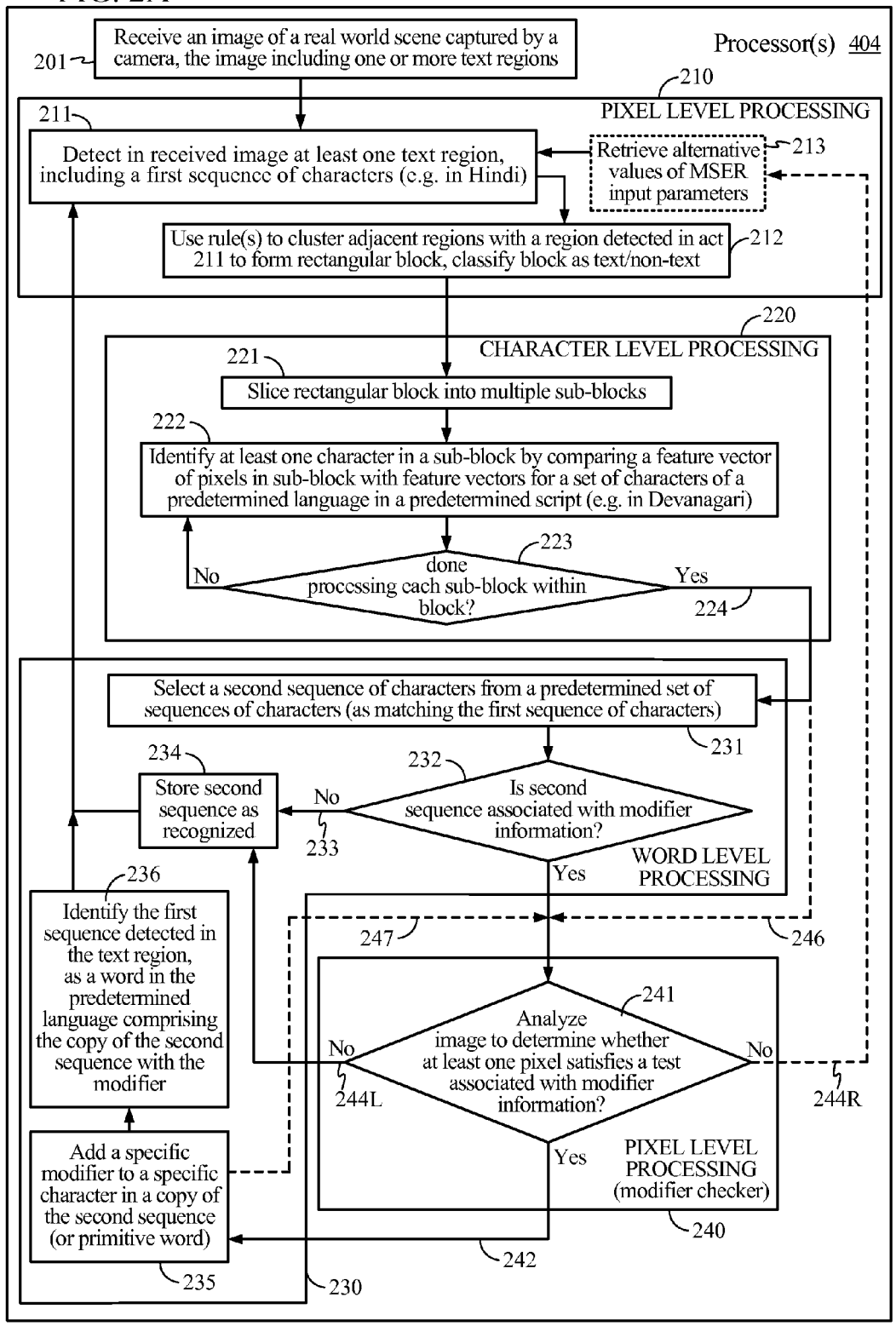
FIG. 2A illustrates, in a high-level flow chart, acts performed by one or more processors in several described embodiments, to perform OCR on a camera captured image to recognize words that may be modifier-absent words or modifier-present words.

Referring to FIG. 2A, one or more processor(s) of some embodiments perform pixel level processing in an operation 210 to identify regions of pixels grouped into blocks that are classified as text by performing the acts 211, 212 (and optionally the act 213) as described below. Specifically, a block in a portion of an image (such as image 107) may be detected by processor 404 in an act 211 (after image capture in act 201) by use of any method that detects in an image 107, one or more regions (also called "blobs") that differ from surrounding pixels in one or more properties, such as intensity and/or color. Image 107 (also called "natural image") which may be captured by act 201 (FIG. 2A) of some embodiments may be, e.g. a frame of live video captured by a video camera or as a still image captured by a digital camera, and either of these two cameras is referred to herein as camera 405 (FIG. 6).

Figure 1:
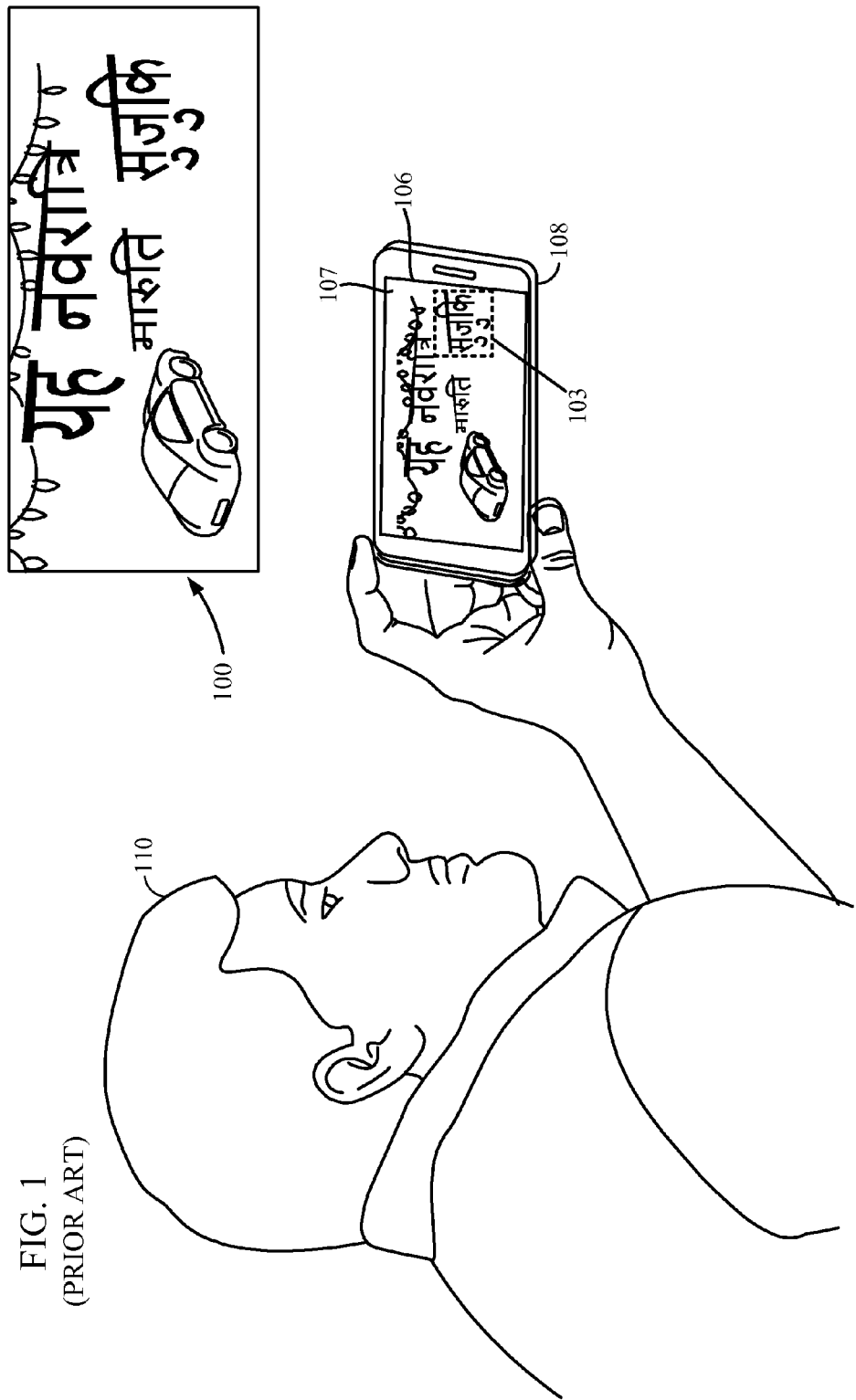
FIG. 1 illustrates a user using a camera-equipped mobile device of the prior art to capture an image of a bill-board in the real world.

After image 107 (FIG. 1) is captured, regions therein are detected in the normal manner by act 211 (FIG. 2A), e.g. based on variation in intensities of pixels in image 107. The regions that are detected in act 211 may be similar or identical to regions known in the prior art as connected components, and/or maximally stable extremal regions or MSERs. Specifically, in some embodiments, a processor 404 (FIG. 6) in mobile device 401 detects, by performing an act 211 in FIG. 2A, a region 264 (FIG. 2B) in a block 260 of the image (such as image 107). Region 264 is detected in the normal manner during initialization in operation 210, e.g. based on variation in intensities of pixels in image 107.

A specific manner in which pixels of a region 264 (FIG. 2B) differ from surrounding pixels at the boundary may be detected by use of an MSER method in a predetermined manner in some embodiments by use of a lookup table 290 (FIG. 2I) in memory 501 to obtain input parameters. Such a lookup table 290 may supply one or more specific combinations of values for the parameters Δ and Max Variation, which are input to an MSER method (also called MSER input parameters). Such a lookup table may be populated ahead of time, with specific values for Δ and Max Variation, e.g. determined by experimentation to generate contours that are appropriate for recognition of text in a natural image, such as value 8 for Δ and value 0.07 for Max Variation as shown in the first row of lookup table 290 (FIG. 2I).

In some embodiments, pixels are identified in a set of positions (which may be implemented in a list) that in turn identifies a region $Q_i$ which includes a local extrema of intensity (such as local maxima or local minima) in image 107. Such a region $Q_i$ may be detected in act 211 (FIG. 2A) as being maximally stable relative to one or more intensities in a range i–Δ to i+Δ (depending on the embodiment, including the above-described intensity i), each intensity i being used as a threshold (with Δ being a parameter input to an MSER method) in comparisons with intensities of a plurality of pixels included in region $Q_i$ to identify respective regions $Q_{i-\Delta}$ and $Q_{i+\Delta}$. In some embodiments, a number of pixels in the region $Q_i$ remains within a predetermined (e.g. user specified) range relative to changes in intensity i across a range i–Δ to i+Δ, with a local minima in a ratio $[Q_{i-\Delta} - Q_{i+\Delta}]/Q_i$ occurring at the intensity i. Therefore, the just-described set of positions in certain embodiments are indicative of (or identify) a region $Q_i$ that constitutes an MSER (i.e. a maximally stable extremal region).

Regions may be detected in act 211 by use of a method of the type described in an article entitled "Robust Wide Baseline Stereo from Maximally Stable Extremal Regions" by J. Matas, O. Chum, M. Urban, and T. Pajdla, BMVC 2002, pages 384-393 that is incorporated by reference herein in its entirety. Alternatively other methods can be used to perform connected component analysis and detection of regions in act 211 e.g. methods of the type described by SHIN et al. "Application of Floyd-Warshall Labelling Technique: Identification of Connected Pixel Components In Binary Image", published in Kangweon-Kyungki Math. Jour. 14 (2006), No. 1, pp. 47-55 that is incorporated by reference herein in its entirety, or as described PARK et al. "Fast Connected Component Labeling Algorithm Using A Divide and Conquer Technique", believed to be published in Matrix (2000), Volume: 4, Issue: 1, Publisher: Elsevier Ltd, pages 4-7 that is also incorporated by reference herein in its entirety.

Hence, a specific manner in which regions of an image 107 are detected in act 211 by mobile device 401 in described embodiments can be different, depending on the embodiment. In several embodiments, each region of image 107 that is detected by use of an MSER method of the type described above is represented by act 211 in the form of a list of pixels, with two coordinates for each pixel, namely the x-coordinate and the y-coordinate in two dimensional space (of the image). After identification of regions by MSER, each region is initially included in a single rectangular block (such as region 264 in block 262) which may be automatically identified by mobile device 401 of some embodiments in act 211, e.g. as a minimum bounding rectangle (not shown) of region 264 (FIG. 2B), by identification of a largest x-coordinate, a largest y-coordinate, a smallest x-coordinate and a smallest y-coordinate of all pixels within the region. The just-described four coordinates may be used in act 211, or subsequently when needed, to identify the corners of a rectangular block that tightly fits the region. Specifically, four corners of a block 262 (FIG. 2B) that is rectangular in shape and includes region 264 (FIG. 2B) may be identified, e.g. as follows:
(largest x-coordinate, largest y-coordinate),
(largest x-coordinate, smallest y-coordinate),
(smallest x-coordinate, largest y-coordinate) and
(smallest x-coordinate, smallest y-coordinate).

Figure 2B:
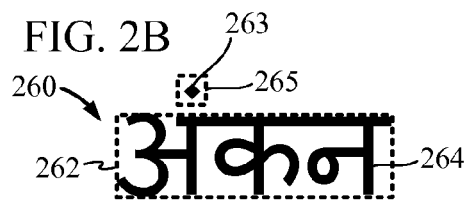
FIG. 2B illustrates an image portion 260 which includes a dot 263 and a region 264 identified in some embodiments by performing an MSER method on an image in act 211 of FIG. 2A.

Such a block 262 may be a bounding box that tightly fits region 264 in FIG. 2B, in some embodiments. The above-described acts 211 and 212 are performed in several embodiments, in an initialization in operation 210 (FIG. 2A) in a manner similar or identical to corresponding operations of the prior art. A block 262 (and its four corners) may be used in act 212 (FIG. 2A) in checking whether a rule (also called "clustering" rule) is satisfied, e.g. by one or more geometric attributes of block 262 and/or attributes relative to a block 265 adjacent thereto and when satisfied the blocks 262 and 265 are merged (e.g. to form block 266 in FIG. 2B).

After application of one or more rules to merge blocks as noted above, act 212 (FIG. 2A) of some embodiments binarizes all pixels in a block 266, followed by generation of a profile of counts of pixels of a common binary value (e.g. value 1 for the color black). A presence of a peak in the profile is then detected by act 212 (using a predetermined test), and a location of the peak relative to a height of block 266 (FIG. 2C) may be used in some embodiments to determine presence of a straight line of pixels in block 266. When a line 264S of pixels of a common binary value is determined to be present in block 266 (FIG. 2C), block 266 is classified by act 212 as text (e.g. if one or more additional tests are satisfied, such as variance in stroke width). Line 264S may be a straight line that is aligned in a longitudinal direction (e.g. horizontally) relative to a bounding box (e.g. block 262) of a region 264 in the image indicative of a word in Hindi, such as a "shirorekha" in Devanagari as shown in FIG. 2C. Blocks which are classified as text in act 212 may be subject to an operation 220 in which one or more of acts 221, 222 and 223 are performed, as described below.

Referring to FIG. 2A, one or more processor(s) of some embodiments process a block 266 (FIG. 2C) that is generated by pixel level processing in operation 210 by performing character level processing in operation 220 to identify within block 260, a sequence of characters of a predetermined script, such as Devanagari. Specifically, in an act 221, a portion of block 266 that is located below the line 264S is subdivided (or sliced or segmented) to generate a sequence of sub-blocks 266A-266C (FIG. 2C) in act 221 (FIG. 2A) in the normal manner. Accordingly, as per act 222 in FIG. 2A, processor 404 typically receives (e.g. from memory 501, see FIG. 6) a sub-block in a sequence of sub-blocks that have been sliced from within a rectangle in a portion of an image of a scene of real world captured by camera 405.

Sub-blocks 266A-266C (FIG. 2D) may be formed from a block 266 (FIG. 2C) using any known method e.g. based on height of block 266 and a predetermined aspect ratio of characters and/or based on occurrence of spaces outside the boundary of pixels identified as forming portions of region 264 (which may be an MSER) located below line 264S (FIG. 2C). The result of slicing the block 266 (FIG. 2C) in the normal manner in act 221 (FIG. 2A) is a sequence of sub-blocks 266A-266C (FIG. 2D). Each sub-block is then individually subject to optical character recognition (OCR) in act 222 (FIG. 2A) in the normal manner. For example, some embodiments of act 222 compare a feature vector of pixels in a sub-block with feature vectors for a set of characters of a language in a predetermined script such as Devanagari.

Processor 404 then checks if all sub-blocks 266A-266C are processed in act 223 and returns to act 222 when not. Acts 222 and 223 may be performed in a loop, to identify characters in block 266, corresponding to the sequence of sub-blocks 266A-266C sliced from block 266. When all sub-blocks 266A-266C of a block 266 have been processed as described above (to identify characters therein), control transfers via branch 224 (FIG. 2A) to an operation 230, in which one or more of acts 231, 232, 234, 235 and 236 are performed in some embodiments, as described below. Note that in some embodiments, branch 224 may transition as per branch 246 (shown dashed in FIG. 2A) to operation 240, wherein an act is performed to identify a modifier which may be checked subsequently, after identification and temporary storage, e.g. as described in reference to FIG. 4.

In act 231, processor 404 uses characters identified by operation 220 as being recognized in sub-blocks 266A-266 of block 266 to select a second sequence of characters. In some embodiments, act 231 is performed on a first sub-block such as sub-block 266A (FIG. 2D) to identify a first group of characters (e.g. three characters) that are alternatives to one another, with each character in the first group being associated with a probability of accuracy of recognition in the sub-block 266A. Similarly, act 231 is performed on a second sub-block such as sub-block 266B (FIG. 2D) to identify a second group of characters (e.g. three characters) that are also alternatives to one another, with each character in the second group being associated with a probability of accuracy of recognition in the sub-block 266B. Similarly, act 231 is performed on a third sub-block such as sub-block 266C (FIG. 2D) to identify a third group of characters.

Then, processor 404 may use a sequence of sub-blocks 266A-266C in the detected text region in image 107 to form multiple sequences of characters, by including one character from each group for each sub-block. For example, the first character in each group may be selected by processor 404 to form one sequence. In this example, processor 404 may use the first character in each group except the last group with the second character in the last group to form another sequence. Such sequence formation is done repeatedly by processor 404 of some embodiments, so that memory 501 holds multiple sequences of characters, with each sequence being a candidate for recognition in block 262 (also called "candidate sequence").

Subsequently, processor 404 (also in act 231 in FIG. 2A) compares a candidate sequence (e.g. one of the multiple candidate sequences) with a predetermined set of sequences 271 (FIG. 2H) of characters (stored in a repository 270), to select a second sequence from the set of sequences 271, as matching the sequence of sub-blocks, in the detected text region in image 107 (i.e. as matching the first sequence of characters). For example, a second sequence 276 (FIG. 2H) may be selected in act 231 when a probability of recognition of the second sequence 276 in sub-blocks 266A-266C is found to be greater than a threshold value, such as 0.90. The probability of recognition of the second sequence 276 in sub-blocks 266A-266C (FIG. 2D) is computed by processor 404 based on the probability of accuracy of recognition of each character at nodes 276A, 276B and 276C (FIG. 2H) relative to predetermined values in corresponding paths through a trellis 271T (FIG. 2H) which is used in some embodiments. In the just-described example, if the probability of a specific path through trellis 271T (corresponding to the second sequence) is below a threshold, no selection is made, and act 231 may be repeated by comparing another candidate sequence with multiple sequences stored in trellis 271T (FIG. 2H).

After a second sequence 276 (FIG. 2H) is selected, processor 404 checks in repository 270 (see act 232 of FIG. 2A) whether the second sequence 276 has modifier information 280 (also called "additional information" or "side information") to be checked. For example, a last character at node 276C of the prefix tree in the second sequence 276 may be associated with a flag 282 in modifier information 280 which when set (e.g. to logical value TRUE) indicates presence of a data structure 285 which identifies a test to be done. Instead of flag 282, a pointer may be used directly in some embodiments, with a null pointer in modifier information 280 indicating no test to be done and a non-null pointer in modifier information 280 pointing to data structure 285 (and need for further testing).

If repository 270 indicates that no data structure is present (and thus no further test needs to be done) for a second sequence, processor 404 stores (in act 234 of FIG. 2A) the second sequence in memory 501, as a word that has now been recognized in block 262 and thereafter returns to operation 210 (to act 211 therein). Hence, when the branch 233 (labeled "no") is taken from act 232 to go to act 234, the word stored in memory 501 is a second sequence of characters, selected by act 231.

A set of sequences used in act 231 (and retrieved from a repository 270) of some embodiments includes sequences of characters of normal words of a predetermined language that do not have modifiers and further includes sequences of characters (also called "primitive words") that when combined with one or more groups of pixels (that constitute one or more modifiers) result in normal words in the predetermined language. In examples illustrated in FIGS. 2E and 2F, the Hindi words 272 and 278 (namely अंग and अंक) both have in common the first character अं which is a modified character in the Devanagari script obtained by adding modifier ़ (called DOT maatra) to character अ (also called "base" character or "unmodified" character).

In some embodiments, the just-described two words अंग and अंक in Hindi are stored in repository 270 in a trellis 271T in a tree with the primitive word अंकन wherein the character अ which is common to all three words forms a root node, e.g. node 276A of the tree (also called prefix tree). More specifically, the primitive word अंकन is represented in the tree in trellis 271T by the three nodes 276A, 276B and 276C for each of the three unmodified characters अ, क and न in the primitive word. Furthermore, as indicated by a flag 282 in FIG. 2H, a second sequence 276 of characters (अ, क, न) is associated with a data structure 285, which indicates that a check needs to be made at the position 285P shown in FIG. 2H (in this example, of value 1 or the first position), for a modifier of type 285T (in this example, of value DOT maatra). In the above-described example, processor 404 tests for presence of a dot (or period) on top of the first character अ in the primitive.

The same data structure 285 may be additionally used to recognize another word अंग after recognition of the two unmodified characters अ and ग (shown in trellis 271T at the respective nodes 276A and 277A) followed by checking the flag 283 in modifier information 280 (in embodiments that use flags 281). Similarly, flag 284 in modifier information 280 maybe checked after recognition of the two unmodified characters अ and क (shown in trellis 271T at the respective nodes 276A and 276B). Accordingly, in the example of FIG. 2H, data structure 285 is associated with each of three primitives or sequences of characters (अ ग), (अ क) and (अ क ग). When any one of these three primitives is selected by processor 404 in act 231, followed by processor 404 finding in act 241 that pixels representing the DOT maatra are present in the image (e.g. on top of the character अ in the respective primitive or sequence), then in act 236 processor 404 recognizes the corresponding word (shown in FIGS. 2C, 2E and 2F respectively).

Thus, as shown in FIG. 2A, processor 404 may find in act 232, by use of repository 270 that a second sequence 276 (FIG. 2H) that is selected in act 231 has associated therewith a data structure containing modifier information to be checked. Therefore, if the answer is yes in act 232 (FIG. 2A), the word level processing in operation 230 is suspended in several embodiments, and control transfers to a pixel level processing in operation 240. In act 241 (FIG. 2A) during pixel level processing in operation 240, processor 404 analyzes the image to determine whether at least one pixel satisfies a test specified in modifier information 280 in data structure 285. Specifically, in some embodiments, act 241 checks if the image has at least one pixel that satisfies a predetermined test associated with the modifier information 280 (with the predetermined test being based on a specific modifier in a specific script such as Devanagari).

When the predetermined test (for one or more pixels indicative of a specific modifier) is found to be satisfied in act 241 (FIG. 2A), and if no more modifiers are to be checked (e.g. see position 287P and type 287T in FIG. 2H) then control transfers via branch 242 to act 235 which resumes word level processing in operation 230. In act 235, processor 404 adds a modifier to a specific character in a copy of the second sequence of characters. Specifically, in act 235 (FIG. 2A), processor 404 adds to a numeric representation of a specific modifier that is identified by use of modifier information 280 to a numeric representation of a specific character (in a copy of the specific sequence selected in act 231), e.g. a numeric representation of the modifier ं is concatenated with a numeric representation of the character अ, to obtain the numeric representation of the modified character अं in the script Devanagari. Thereafter, a combination (of the specific sequence recognized (अकन) and the modifier e.g. ं) are together identified (and stored in memory 501) in act 236, as recognized to be a word comprising the first sequence of characters in the text region in image 107 (e.g. अंकन) in a predetermined language, and control transfers to act 211. Act 235 (or act 236) may transition to operation 240 (e.g. via branch 247, see FIG. 2A) in some embodiments when additional modifiers are to be checked, e.g. as indicated in data structure 285 in modifier information 280.

Modifier information 280 (FIG. 2H) can indicate one or more different modifiers or no modifier, depending on the word and/or depending on the embodiment. For example, in an image region wherein the specific sequence 279 of characters (अ, क, ल) has been recognized, processor 404 may use the last node 279A in the prefix tree to check flag 286 in modifier information 280 which indicates that there is no modifier, so that the word अकल (FIG. 2G) is then recognized, as a sequence of characters without a modifier. Also, flag 283 when set identifies data structure 285 while another flag 284 when set may identify a different data structure (not shown). Moreover, data structure 285 in modifier information 280 may indicate different modifiers at different positions in a sequence of characters, e.g. a first modifier indicated by type 285T (for position 285P) may be different from a second modifier indicated by type 287T (for position 287P). Depending on the embodiment, any number of positions in a sequence of characters (and at each position any type of modifier) may be stored in such a data structure 285.

In several embodiments, position 285P and type 285T in data structure 285 in modifier information 280 require act 241 (FIG. 2A) to check for a group of pixels of a common binary value in a shape and size similar or identical to a period or dot 263 (e.g. to detect a modifier called DOT maatra ं) which if present may be located at a specific position (e.g. at a position of the first character) above a line 264S of pixels in a word in a natural language (such as Hindi).

Figure 2E:
FIGS. 2E-2G illustrate prior art images of three words in the language Hindi, written in the script Devanagari.
Figure 2C:
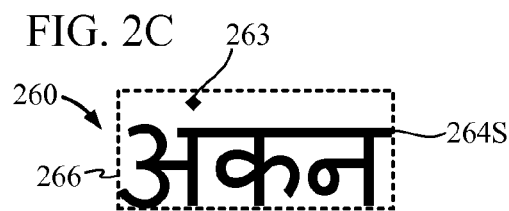
FIG. 2C illustrates a block 266 formed in some embodiments by merger of blocks 262 and 265 of FIG. 2B by performance of act 212 of FIG. 2A.
Figure 2F:
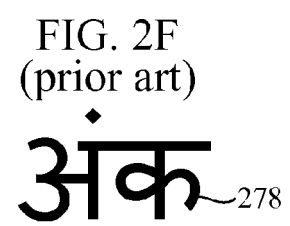
Figure 2D:
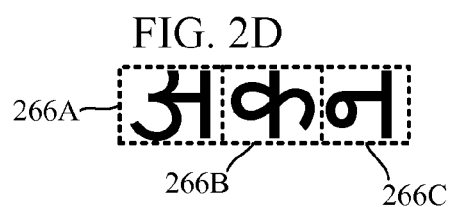
FIG. 2D illustrates sub-blocks 266A-266C obtained by slicing a portion of block 266 located below a straight line 264S of pixels of common binary value in some embodiments on performance of act 221 in FIG. 2A.
Figure 2G:

As will be readily apparent in view of this detailed description, although the examples illustrated in FIGS. 2C, 2E and 2F illustrate a DOT maatra (also called bindu or bindi) ं in data structure 285, other embodiments of such a data structure may indicate other types of modifiers. As one example, a Chandra bindu maatra (also spelled as Candrabindu or Chandra bindi) ँ illustrated by modifier 291 on top of the last character (see FIG. 2J) may be checked by including in such a data structure (see FIG. 2K), the position 291P and type 291T. As another example, a Chandra maatra ँ as illustrated by modifier 292 on top of the first character (see FIG. 2L) may be checked by including in such a data structure (see FIG. 2M), the position 292P and type 292T. Although in some embodiments, a single list of data structures 285 is used to hold information on multiple types of modifiers as shown in FIG. 2H, in other embodiments, multiple lists of data structures may be used to hold information on corresponding types of modifiers. In certain embodiments, the last character of each sequence in trellis 271T (in FIG. 2H) at the leaf of a prefix tree has a pointer to a single data structure, with no flag (i.e. no flags 281), and this pointer being null indicates that there is no modifier information for the prefix word (or sequence of characters). In one such embodiment, the data structure in repository 270 identifies only a single type of modifier (e.g. the DOT maatra) and hence there is no type 285T in the data structure and instead the data structure identifies positions 285P, 287P . . . at which the single type of modifier (e.g. the DOT maatra) must be found in the image relative to the sequence of characters, to be recognized as a valid word in a dictionary.

Also depending on the embodiment, instead of, or in addition to, the above-described modifiers, modifier information in a data structure 285 of the type described above may require act 241 to check the image for occurrence of pixels of a common binary value in conformance with other patterns, e.g. denoting any one of three different maatras, ो ौ and ों at the end of a sequence of characters (after a specific sequence of characters associated therewith is recognized, as present in the image) as in the following words (in the language Hindi) लड़का, लड़की, लड़को obtained by combination of a modifier with the primitive word (or sequence of characters) लड़क.

Referring to FIG. 2A, when the answer in act 241 is no, control may transfer via branch 244L to act 234 (which resumes word level processing in operation 230), e.g. when the modifier information in data structure 285 has another flag which indicates that the specific word (or sequence of characters) can occur by itself as a normal word in the predetermined language. For example, in some languages such as Hindi, a specific word may have variants that occur both with and without modifiers, and hence certain embodiments that recognize such a language may be programmed to recognize a sequence of characters that occur in an image with or without presence of pixels that represent one or more modifier(s).

In certain embodiments, when the answer in act 241 is no, and the probability of recognition of the specific sequence in block 262 is found to be below another threshold value, such as 0.50, control transfers via branch 244R (FIG. 2A) to act 213 (which continues pixel level processing, by repeating the operation 210). Specifically, in several such embodiments, act 213 retrieves an alternative set of values of certain MSER input parameters from memory 501, e.g. from the second row in lookup table 290 (FIG. 2I) if not already used, and if used then from the third row in lookup table 290.

Accordingly, information in the second row and the third row of lookup table 290 (FIG. 2I) is used in some embodiments to re-inspect an original version of the image prior to binarization, and to again perform a method to identify connected components and/or maximally stable extremal regions (MSERs), using different input parameters. In some embodiments, the method and device use input parameters that improve resolution, e.g. by reducing one input parameter Δ ("delta") and increasing another input parameter Max Variation, which enables more contours to be formed while performing an MSER method relative to performing the same MSER method on the entire image (using default input parameters, e.g. in the first row of lookup table 290). When all three rows of lookup table 290 (FIG. 2I) have been used with a portion of an image, no further pixel level operation is performed, and instead processor 404 displays an error message on a screen of mobile device 401. Depending on the embodiment, such an error message may show as multiple options on the screen, multiple words to which an image portion can be decoded, and solicit user input to select one of the options or manually identify a word.

Figure 3A:
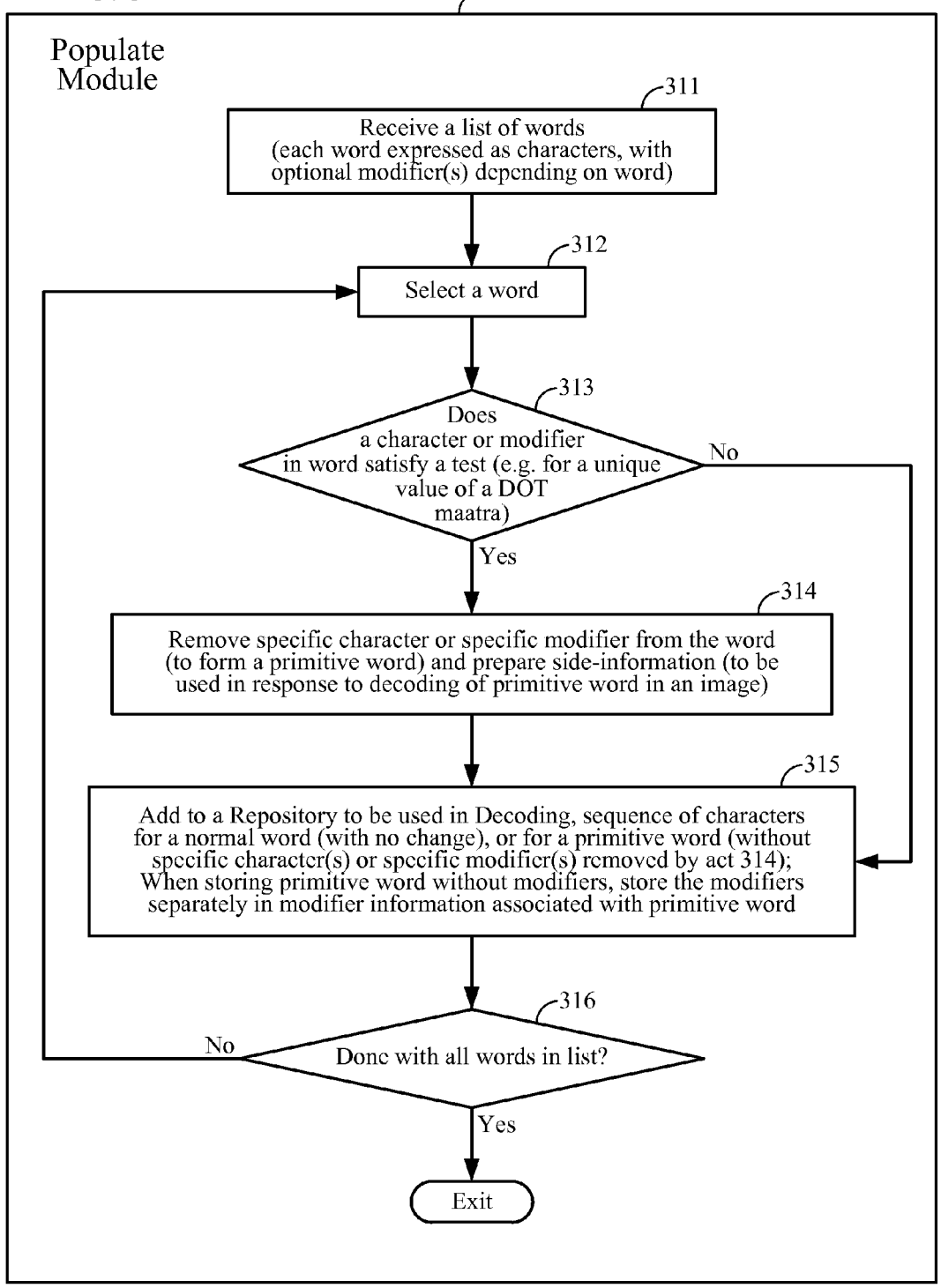
FIG. 3A illustrates, in a high-level flow chart, preparation by a server computer 1015 in several embodiments, of a predetermined set of sequences of characters (in repository 270 of FIG. 2H) which include words 275 without modifiers (also referred to herein as modifier-absent words), as well as primitive words 274 that must be combined with certain modifiers to form valid words (also referred to as modifier-present words).

Repository 270 that is used in act 231 to recognize sequences of characters (also called "primitive words") in a block of an image in several embodiments is prepared ahead of time before recognition of words in images, by off-line computation (e.g. in a server computer 1015 or processor 404 performing a method illustrated in FIG. 3A). Specifically, processor 404 may be programmed to prepare a predetermined set of sequences 271 or prefix words in repository 270 and corresponding modifier information 280 (FIG. 2H) by removing predetermined modifiers, such as diacritical marks or accent marks (also called "matraas") from words (also called "normal words" or "dictionary words") that occur normally in text of a predetermined language, such as Hindi. In summary, the just-described off-line computation forms the primitive words 274 (or sequences of characters) and corresponding modifier information 280 including one or more data structure(s) 285 identifying the predetermined modifiers that were removed.

In some embodiments, a server computer 1015 performs the off-line computation by using a populate module 300 of the type illustrated in FIG. 3A, to build repository 270 (FIG. 2H) with sequences of characters and modifier information associated therewith, as follows. Populate module 300 receives in an act 311 a list of words (also called "normal" words) that normally occur in a predetermined language, e.g. retrieved from any dictionary of words of the language Hindi. In certain embodiments, the characters (and modifiers if any) of each word in the list received in act 311 are expressed as a sequence of numbers (such as hexadecimal numbers, e.g. in Unicode representation or any similar representation in integers), in a predetermined manner that is also used in the method of FIG. 2A.

Next, in act 312, populate module 300 selects a word from the list. Then, in act 313, populate module 300 checks whether a modifier (or optionally a character, depending on the embodiment) in the selected word satisfies a predetermined test. For example, a selected word may be checked in act 313 by populate module 300 for presence of a predetermined number that represents the DOT maatra ः in the numeric representation. If the answer in act 313 is no, then control transfers to act 315 wherein the sequence of characters from the dictionary word is added to trellis 271T (FIG. 2H) without modifier information, as one of several normal words 275.

If the answer in act 313 is yes, then act 314 is performed to remove the character or the modifier e.g. DOT maatra ः, followed by preparation of modifier information 280 (FIG. 2H) e.g. indicative of relative location, shape etc. of the modifier, to be checked in the image whenever the sequence of characters is found. After act 314, act 315 is performed to add to trellis 271T, the sequence of characters without modifier information and to store the modifier information 280 separately in association with the sequence, for use in checking. After act 315, populate module 300 checks in act 316 whether all words in the list received in act 311 have been processed and if not returns to act 312. When act 316 finds that all words in the list are processed, populate module 300 ends.

In an illustrative example, in the language Hindi, performance of act 314 (FIG. 3A) to remove from the normal word अंकुर of the DOT maatra ः results in a sequence of characters that are referred to herein as a "primitive" word (also called "prefix") अकुर which is included in a predetermined set of sequences in trellis 271T used in the normal manner to recognize text in an image, e.g. by a word decoder. In another example, two dots that form a specific diacritical mark, called diaeresis, over a letter "e" in the word "Noël" in Latin script (e.g. in English) may be removed by act 314 (FIG. 3A) to obtain a sequence of four characters "Noel", which is referred to herein as the primitive word, and included in a predetermined set of words (in a word dictionary).

Although in some embodiments, a dot 263 that is excluded from block 262 (FIG. 2B) as described herein is a DOT maatra ः in Devanagari, any other marks that are smaller than a character may be excluded in other embodiments. Depending on the embodiment, diacritical marks, such as an "acute" mark or a "grave" mark denoting an accent, e.g. as in the word sake in the language English, wherein an acute mark over the letter "e" may be excluded from recognition within a block of the type described herein. Hence, while various examples described herein use Devanagari to illustrate certain concepts, those of skill in the art will appreciate that these concepts may be applied to languages or scripts other than Devanagari. For example, embodiments described herein may be used to identify characters in Korean, Chinese, Japanese, and/or other languages.

Figure 3B:
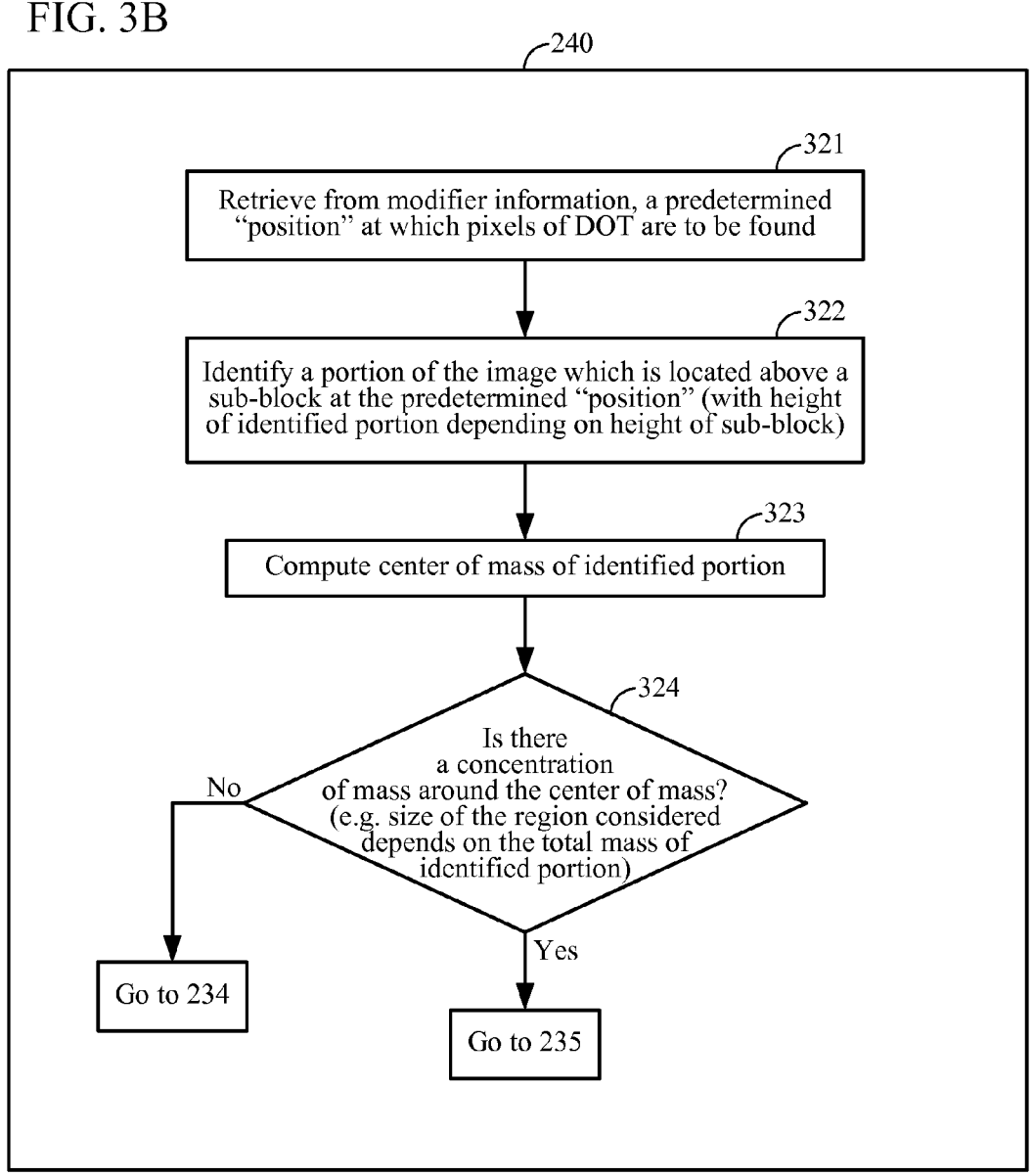
FIG. 3B illustrates, in a high-level flow chart, acts performed by one or more processors in several described embodiments, to implement operation 240 of FIG. 2A by using the predetermined set of words created as illustrated in FIG. 3A.

In some embodiments, processor 404 is programmed to perform operation 240 during on-line computation by a mobile device 401 as illustrated by acts 321-324 in FIG. 3B. Specifically, in act 321 (FIG. 3B) processor 404 retrieves the modifier information 280 (or a portion thereof) from memory 501 (FIG. 2H), and uses data structure 285 to identify a position 285P at which pixels of a modifier of type 285T are to be checked in the image. As noted above, a repository 270 may hold a sequence of characters that form a primitive word stored therein by populate module 300 during off-line computation, and associated therewith modifier information 280 (or side information) for use by mobile device 401 in on-line computation (for recognition of a word of text in a camera-captured image).

Hence, during processing of block 331 (FIG. 3C) of a camera-captured image in act 322 (FIG. 3B), a mobile device 401 uses the position of the sub-block 332 of the first character प to identify a portion 333 of the image which is located above sub-block 332 (which contains the straight line of pixels of common binary value). Portion 333 of the image may be selected to have the same dimensions as the sub-block 332, e.g. same height and same width. However, the dimensions of portion 333 may be selected to be any fraction of the corresponding dimensions of sub-block 332, depending on the embodiment. Next, in act 323, processor 404 performs a predetermined test to check for presence of the DOT maatra ◌ं by computing a center of mass or center of all text pixels (e.g. black pixels) in the portion 333 (FIG. 3D) in act 323 and checking whether the center satisfies a predetermined test, e.g. as described below in reference to act 324.

In an illustrative example, during act 323, the position of each pixel in portion 333 is multiplied by the binary value thereof to obtain a product, followed by summation of all products in each row to obtain a value of the x-coordinate in each row, which is averaged across all rows to obtain the value Xc. Similarly, summation of all products in each column results in a value of the y-coordinate in each column, which is averaged across all columns to obtain the value Yc. The coordinates (Xc, Yc) identify a point 334 (FIG. 3E) which is the center of mass of portion 333. When a group 335 (FIG. 3D) of pixels form a DOT maatra, they have a value 1 (as they are all black) and so their center of mass coincides with center of mass of portion 333 (with all pixels in portion 333 which are outside of group 335 being all white, and having a value 0).

In some embodiments, mobile device 401 checks in an act 324 whether there is a concentration of text pixels (or mass) around the center computed in act 323. Mobile device 401 of such embodiments may traverse a region around the center, with the size of the region depending on the total mass of portion 333 (e.g. total number of text pixels in portion 333). In some embodiments, mobile device 401 is programmed to start from the center computed in act 323, and traverse neighboring pixels in concentric rings (e.g. in a clockwise direction), until the number of pixels traversed reaches the number of text pixels in portion 333. During such traversal, mobile device 401 maintains a count of the number of text pixels encountered. When traversal is completed, mobile device 401 compares the count at the end of traversal to the total number of text pixels in region 333 (i.e. compares mass around the center to mass in portion 333). When the count is comparable to the total number of text pixels in region 333 (e.g. count is at least 50% of the total number), then a DOT maatra is determined to be present, and processor 404 goes from act 324 to act 235. If the result in act 324 is no, then processor 404 goes from act 324 to act 234, as the DOT maatra is determined to be not present.

FIG. 3F illustrates a region 336 which is located on top of the letter ड in the Devanagari script in the block 331 (FIG. 3C). If act 323 is performed on region 336, the center of mass at point 337 (FIG. 3G) does not satisfy act 324 and therefore processor 404 determines that there is no DOT maatra in region 336. As will be readily apparent in view of this detailed description, a similar test may be used to identify presence of other modifiers, e.g. a Chandra-bindu maatra in region 339 (FIG. 3H) or a Chandra maatra in region 343 (FIG. 3K), as indicated by side information (e.g. in a data structure 285 of FIG. 2H) of the type described above. One such test is described below as an illustrative example, in reference to FIG. 3L.

As another example, presence of modifier information for the character sequence अकुर on being identified during online decoding of a block of a camera-captured image by mobile device 401 triggers performance of alternatives to acts 323 and 324 in the mobile device 401 to check for a group of pixels present at a specific relative location above the first character "अ" and this check may test whether the group of pixels form a dot of a specific size (e.g. relative to a character) and/or specific shape (e.g. circle or square) to be recognized as the DOT maatra ◌ं in Devanagari.

In another example, alternatives to acts 323 and 324 in the mobile device 401 may use modifier information for a character sequence "Noel" on being identified during such online decoding of an image to check therein for two groups of pixels present at specific locations just above the third character "e", and this check may test that the two groups of pixels are of specific size, specific shape and separated by specific distance between one another, and another specific distance from the character "e", to be recognized as the diaeresis mark in Latin script.

Depending on the embodiment, a type of test in data structure 285 in modifier information 280 need not require checking strictly for presence of two groups of pixels because the check may be more relaxed based on detection of the character sequence "Noel", e.g. allowing the presence of a single group of pixels to be sufficient for mobile device 401 to recognize a rectangular portion of the image as being the word Noël. Accordingly, the specific predetermined information which is used in acts 323 and 324 to detect the presence of a modifier can be different from a specific description of the modifier itself.

Note that depending on the size of block 265 (FIG. 2B), a group of pixels that form a modifier (e.g. dot 263 in FIG. 2B) may be present within the rectangle of block 262, outside the rectangle of block 262 or partially within and partially outside the rectangle of block 262 from which the primitive word (e.g. the sequence अकल ) has been identified. Accordingly, the location of a modifier (e.g. dot 263 in FIG. 2B) in the image relative to the rectangle of block 262 may depend, for example, on the size and shape of a connected component or region 264 (which may be an MSER) that has been recognized in the rectangle of block 262 as the primitive word.

Figure 3L:
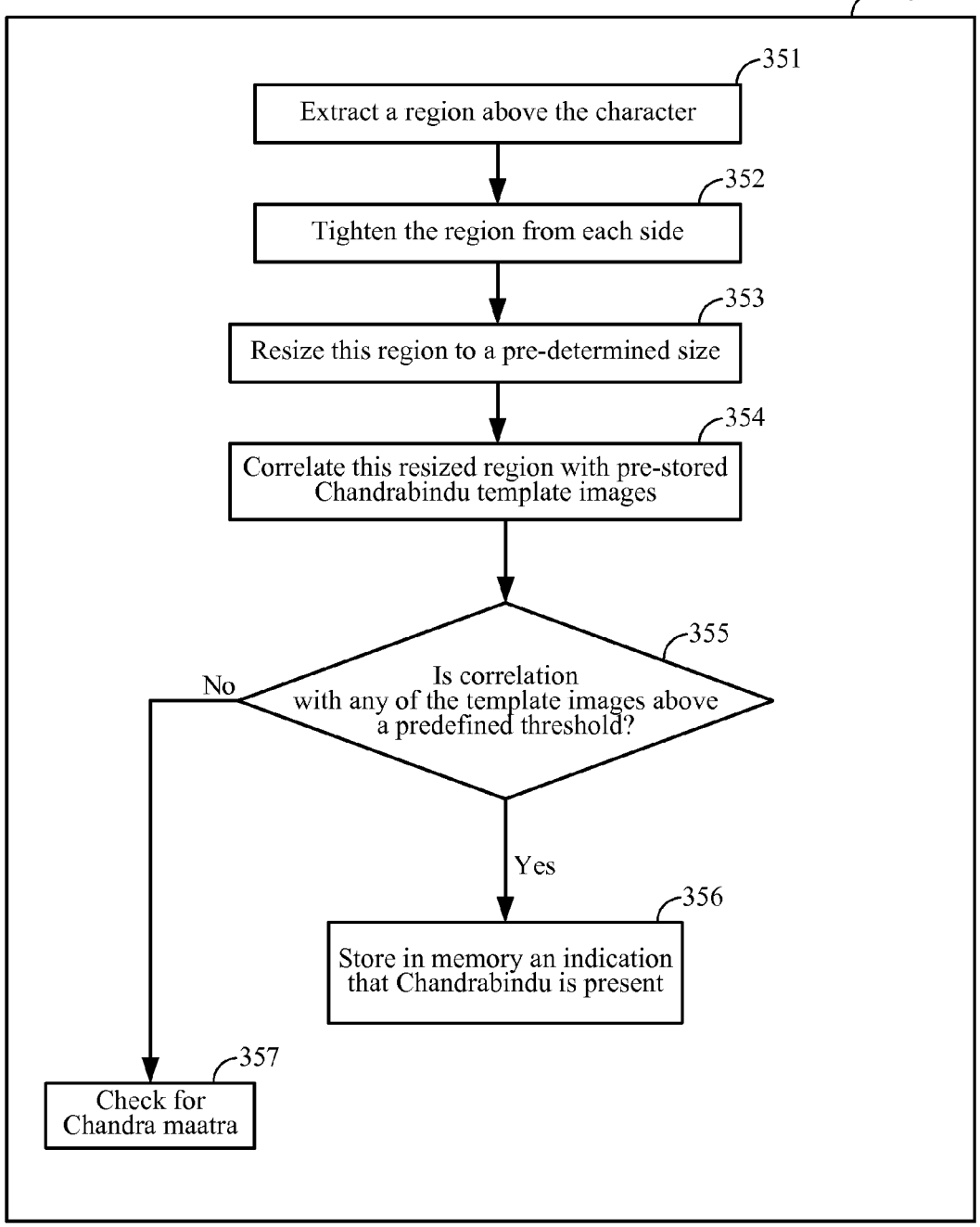
FIG. 3L illustrates, in a flow chart, a method performed in some embodiments to determine presence of a ChandraBindu maatra.

In some embodiments, mobile device 401 is programmed to determine presence of a Chandrabindu maatra during pixel level processing in operation 240, as illustrated in FIG. 3L. Specifically, in act 351, processor 404 extracts from a block containing a word of text, a region located above a character, as indicated in side information. For example, side information in FIG. 2K indicates that a region in a top portion of a sub-block at position 3 in a sequence of sub-blocks (see FIG. 2J) is to be extracted including Chandrabindu 291. Similarly, region 339 of image 331 in FIG. 3C is extracted by processor 404 in act 351, as illustrated in FIG. 3H.

Thereafter, in act 352 (FIG. 3L) the extracted region is "tightened" by processor 404 changing each side of the boundary by moving the side closer to the center, to exclude non-text pixels at the boundary, which results in region 341 illustrated in FIG. 3I. Then, in an act 353 (FIG. 3L), the region 341 is re-sized, to a specific size that is predetermined (e.g. 40 pixels×40 pixels), e.g. by scaling up or scaling down (depending on the size of the original image) so that the result is a re-sized region 342 (FIG. 3J). Thus, when act 353 is completed, re-sized region 342 is of the same size as the size of pre-stored templates (e.g. reference images) of the Chandrabindu maatra.

The re-sized region 342 is then subject to correlation in act 354, with each pre-stored template (e.g. in a database). The result of correlation is checked in act 355. When act 355 finds that there is sufficient correlation (e.g. greater than or equal to 80% correlation), then an indication is stored (e.g. as per act 356 in FIG. 3L) in memory 501 identifying the ChandraBindu as present, in the extracted region, at the expected position (in the sequence of sub-blocks of a word of text that is being recognized). When act 355 finds that there is insufficient correlation (e.g. less than 80% correlation), then another act 357 is performed, which may check for another maatra, such as the Chandra maatra, depending on the embodiment. For example, processor 404 may perform act 354 again, using another set of template images (for the Chandra maatra).

Mobile device 401 of several embodiments is configured to find the most likely (valid) word from a repository 270 (FIG. 2H), given outputs from a character decoder. In certain embodiments, a method using a trellis 271T with a tree of prefixes or primitive words (called "prefix-tree") of the type shown in FIG. 2H is used to identify the most likely word (or sequence of characters). In some embodiments, the density of transitions decreases while the number of nodes increases on advancing through a trellis as shown from left to right in FIG. 2H. In such an embodiment, words (or character sequences) of different lengths may be stored as parts of different trellises.

In some embodiments, trellis 271T is made and used as described in U.S. Provisional Application No. 61/673,606 entitled "Trellis based word decoder with reverse pass" and in U.S. application Ser. No. 13/829,960, entitled "Trellis based word decoder with reverse pass", both incorporated by reference above.

A server computer 1015 may be programmed to read each dictionary word, to create a prefix-tree based trellis (in an offline computation) by processing each word from left to right (see FIG. 2H) and also in the reverse direction by processing each word from right to left to generate two prefix-tree based trellises (of a type not shown). During decoding, a mobile device 401 of several embodiments is configured to restrict the transitions at each stage based on the character decoder outputs, by storing M (usually small) best paths at each stage. The mobile device 401 of some embodiments is also capable of returning the M best words at the end, and can also combine a reverse pass decoding.

Although marks of the type described above are located above a sequence of characters, other marks that are located on other sides of the sequence of characters can be processed in a similar manner, depending on the embodiment. For example, in certain embodiments that perform a method of the type illustrated in FIG. 4, primitive words are obtained by a server computer 1015 removing certain modifiers from either or both ends (at the left and right) of normal words that occur in a predetermined language, such as Hindi. Specifically, when a modifier in the form of vowel maatra at the end of each of three normal words (in the language Hindi) लड़का, लड़की, लड़को is removed, a common primitive word लड़क is obtained in each case. Hence, the populate module (e.g. executed by a server computer 1015 or processor 404) stores the primitive word लड़क in repository 270, and annotates the entry for this word with predetermined information indicative of a need to check for one or more vowel maatras. For example, modifier information associated (in repository 270) with the primitive word लड़क may be configured by the populate module to identify each of three different modifiers or vowel maatras, ाा ाी and ाो so that any one of these three modifiers may be recognized during online-computation by processor 404 on occurring in combination with this primitive word (or specific sequence of characters), in an image.

In some embodiments, a mobile device performs operations 210, 220, 230 and 240 in a manner similar to that described above in reference to FIG. 2A, except for differences illustrated in FIG. 4 and/or described as follows. In act 223, when the answer is yes, control transfers to act 223A wherein processor 404 checks if the last sub-block recognized in the sequence of sub-blocks is one of the three modifiers, e.g. one of the three maatras, ाा ाी and ाो and if not then branch 224 is taken to go to act 231. When the answer in act 223A is yes, then control transfers to act 223B (FIG. 4) wherein the modifier is removed from sequence (that before removal includes the modifier), and the removed modifier is stored in a temporary location in memory 501 for use in act 241A (described below).

The result of modifier removal in act 223B is a sequence that matches a primitive in act 231. The result of matching in act 231 is used by an act 232 as described above in reference to FIG. 2A, followed by act 241A in FIG. 4 (instead of act 241 of FIG. 2A). Act 241A of FIG. 4 checks whether or not the removed modifier currently stored in a temporary location in memory 501 matches one of a group of predetermined modifiers associated with the primitive, and if so control transfers to act 235. In act 235, a predetermined modifier that matches the removed modifier is appended to the last character in the primitive and the result of addition is then stored in act 236.

Specifically, when the result of act 241A is yes, e.g. to indicate that the character stored in act 223B is the maatra ाी (which is one of three predetermined maatras ाा ाी and ाो recognizable in act 241A), and if the specific sequence of characters selected in act 231 is लड़क then the last character क in this sequence is modified in act 235, by adding thereto the maatra ाी stored in act 223B to obtain the modifier-present word लड़की (which is therefore stored in act 236 as being recognized). If the result of act 241A is no, then control may transfer to act 234 (when appropriate, e.g. as per another test), wherein the sequence without the modifier is stored in memory 501.

In an above-described example, a primitive word (or sequence of characters) लड़क is itself not a normal word in the language Hindi and it is not itself recognizable as a valid word in the dictionary, although this sequence of characters has been deliberately stored in trellis 271T in repository 270, for use in recognition (by use of modifier information 280) of one of three variants thereof obtained by combination with a respective one of the maatras, ाा ाी and ाो (each of which is itself a character).

In the above-described example of primitive word (or specific sequence of characters) लड़क, yet another word लड़के which is a legal word in the language Hindi is formed by combination of the primitive word लड़क with another maatra that is located only at the top of the word, specifically the maatra ाे. Accordingly, when the word लड़के is first encountered by a server computer 1015 during off-line computation and needs to be stored in repository 270, its primitive word लड़क may be already found to be present in trellis 271T e.g. based on words with any of three different maatras, ाा ाी and ाो being encountered previously, and in this event an identifier of this word लड़के is associated (along with any other identifiers of the other words) with the same primitive लड़क and the corresponding maatra information for the maatra ाे is also stored in modifier information 280.

Similarly, when trellis 271T already holds an existing word that does not have a DOT maatra ां and when a new word formed by combination of the DOT maatra ां with a primitive word that is same as the normal word is encountered, then both the existing word and the new word are identified by the server computer 1015 using a single entry in trellis 271T, although maatra information is additionally stored in repository 270 for use in recognizing the combination (i.e. the new word).

As will be readily apparent, a modifier may be located not only above and/or to the right of a primitive word, but alternatively or additional could be located below and/or to the left of the primitive word, depending on the corresponding legal word as it occurs in the language (e.g. Hindi). Regardless of where a modifier is located relative to a primitive word, their combination can be easily decoded, as described above, by use of modifier information 280.

Alternatively or additionally, modifier information 280 is used in several embodiments to inspect a binarized version of the original image, for a group of pixels of a specific shape, such as a contour that is convex (e.g. circle, square, triangle), which confirms the presence of a point or period or a DOT maatra ः or any other shape that may be expected (as per the modifier information). For example, when a modifier is a vowel maatra, such as maatra ाी (also called character), as described above, act 241 may be implemented by simply checking the binarized version of the original image for the presence of a vertical line immediately beyond the right side of the rectangular portion being decoded, i.e. at the end of the word. In several such embodiments, the above-described checking may be done directly on a connected component or a maximally stable extremal region (MSER).

Figure 4:
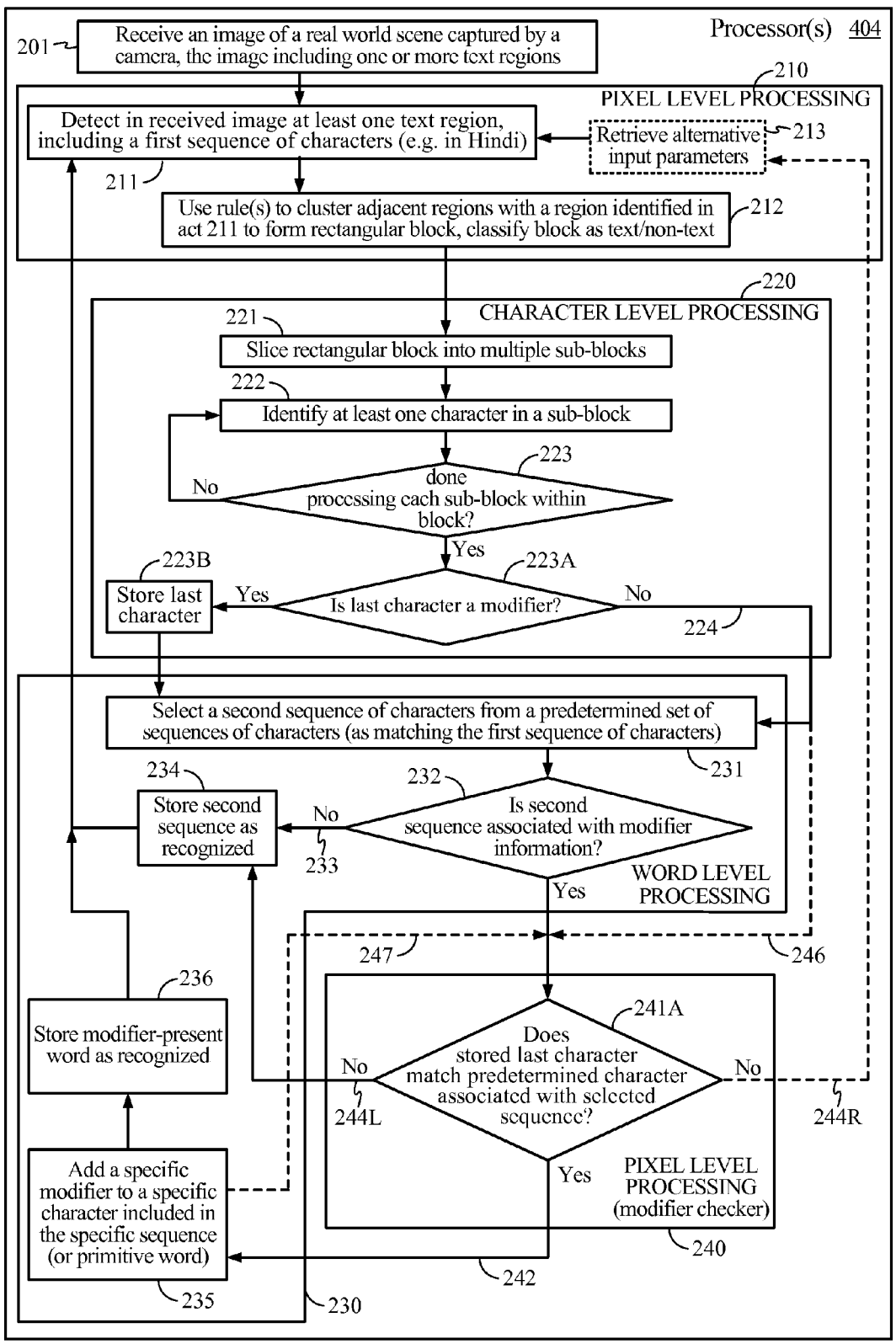
FIG. 4 illustrates, in a high-level flow chart, acts of FIG. 2A performed by one or more processors in several described embodiments, in recognizing words that may include one of multiple maatras to modify a right-most character located at the end of corresponding variants of a word, in certain languages that use the script Devanagari.

Several embodiments of a mobile device 401 perform the method illustrated in FIG. 4 by use of confidence values for each character that is recognized in a sub-block, and confidence value of a sequence of characters that is formed by concatenating the characters of successive sub-blocks in a block. In act 231 of such embodiments, an additional check is made as to whether the confidence value of such a sequence of characters is greater than a preset limit (threshold), and if so then act 232 is performed else act 213 is performed.

In checking done by act 231, one or more of the following checks may be performed: (a) check based on word decoder confidence value; (b) check based on character decoder likelihoods; (c) whether the identified word has been flagged with modifier information. Moreover, in act 241, mobile device 401 may be programmed to perform any one or more of the following acts: (1) re-compute an MSER in this portion of the image, with changed input parameters Δ and Max Variation (as described above); (2) look for specific objects (e.g. to confirm presence of a dot, or other objects); (3) look for specific geometric properties in the image (e.g. to confirm a specific character representing a maatra); (4) binarized using a different threshold; (5) check for skew and correct; (6) check for a missing character, or a maatra.

Figure 5:
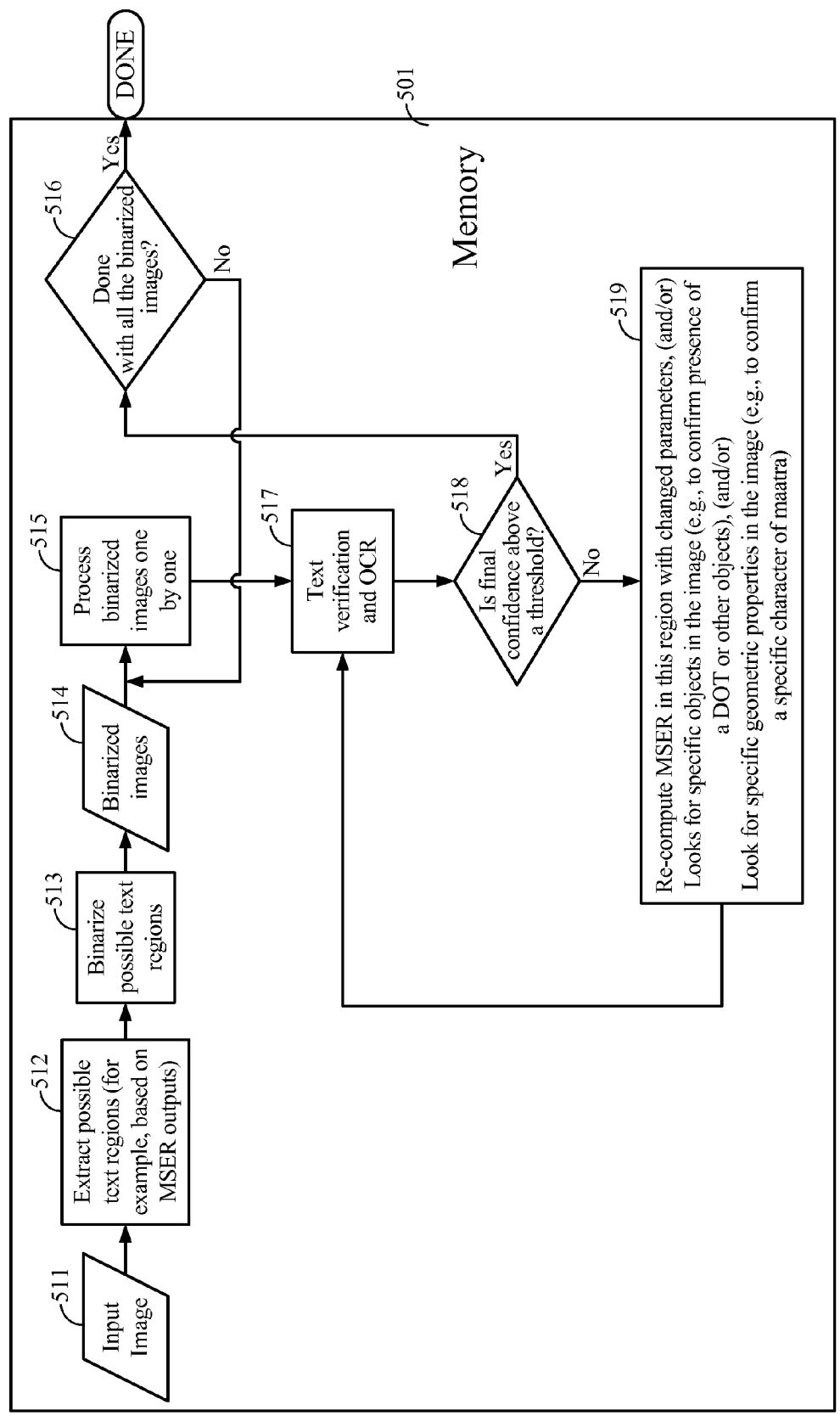
FIG. 5 illustrates, in a high-level flow chart, acts performed by one or more processors in several described embodiments, to implement a feedback loop to re-compute MSER and/or look for specific objects and/or specific geometric properties in an original image.

One or more processors of mobile device 401 may be programmed in several described embodiments, to implement a feedback loop as illustrated in FIG. 5 to re-compute MSER and/or look for specific objects and/or specific geometric properties in an image 511 that may be captured by a handheld camera. Specifically, in stage 512, a processor 404 extracts possible text regions (for example, based on MSER outputs) from image 511. Thereafter, in stage 513 (FIG. 5), processor 404 binarizes the possible text regions to obtain binarized images 514 (FIG. 5). Thereafter, in stage 515 (FIG. 5), processor 404 processes the binarized images 514 one by one as follows. In a stage 517 (FIG. 5), processor performs text verification and OCR, followed by act 518 to check if the final confidence is above a threshold. If the answer in act 518 is yes, then processor 404 goes to act 516. In act 516, processor 404 checks if all binarized images 514 have been processed and if the answer is yes, then the process ends. When the answer in act 516 is no, then processor 404 returns to stage 515 to process another image in the binarized images 514. When the answer in act 518 is no, processor 404 goes to act 519.

In act 519, depending on the embodiment, an MSER of the image portion may be re-computed, with changed parameters of the type illustrated in rows 2 and 3 in lookup table 290 (FIG. 2I). Also in act 519, depending on the embodiment, processor 404 may look for specific objects in the image, e.g. to confirm the presence of a DOT or other objects. Also depending on the embodiment, in act 519, processor 404 may look for specific geometric properties in the image, e.g. to confirm a specific character (of a maatra). On completion of act 519, processor 404 returns to stage 517. Note that after a predetermined number of iterations (e.g. two iterations) in a loop formed by stage 517, and acts 518 and 519, processor 404 may determine that there is no text in the image portion being processed, or alternatively display a message on a screen and solicit user input.

In some embodiments, each word in a list of words received by mobile device 401 includes a sequence of characters, which is identified by a unique identifier. For example the word भारत is identified by a unique identifier in mobile device 401 by representation as a sequence of numbers, with each number representing a character in the sequence (अ, ा, र, त). Accordingly, in several embodiments, repository 270 includes several normal words 275 as well as primitive words 274 where each word is represented as a sequence of characters (as shown above). Furthermore, in some embodiments, a character decoder in mobile device 401 outputs N near possibilities for each character (e.g. 3 most-likely candidate characters, in one illustrative example) with their corresponding likelihood (or probability). Remaining probability in such embodiments may be equally divided among all the other characters in the dictionary.

Mobile device 401 (FIG. 6) of some embodiments that performs the method shown in FIG. 2A or 4 is a handheld device, such as a smartphone that includes a camera 405 (FIG. 6) of the type described above to generate an image of a real world scene that is then processed to identify any characters of Devanagari alphabet therein. As noted above, mobile device 401 may further include sensors 406 that provide information on movement of mobile device 401, such as an accelerometer, a gyroscope, a compass, or the like. Mobile device 401 may use an accelerometer and a compass and/or other sensors to sense tilting and/or turning in the normal manner, to assist processor 404 in determining the orientation and position of a predetermined symbol in an image captured in mobile device 401. Instead of or in addition to sensors 406, mobile device 401 may use images from a camera 405 to assist processor 404 in determining the orientation and position of mobile device 401 relative to the predetermined symbol being imaged.

Also, mobile device 401 may additionally include a graphics engine 1004 and an image processor 1005 that are used in the normal manner. Mobile device 401 may optionally include OCR module 614 (e.g. implemented by processor 404 executing the software 510 in memory 501) to identify characters of text in blocks received as input by OCR module 614 (when software therein is executed by processor 404).

In addition to memory 501, mobile device 401 may include one or more other types of memory such as flash memory (or SD card) or other memory 1008 (FIG. 6) and/or a hard disk and/or an optical disk (also called "secondary memory") to store data and/or software for loading into memory 501 (also called "main memory") and/or for use by processor 404. Mobile device 401 may further include a wireless transmitter and receiver in transceiver 1010 and/or any other communication interfaces 1009. It should be understood that mobile device 401 may be any portable electronic device such as a cellular or other wireless communication device, personal communication system (PCS) device, personal navigation device (PND), Personal Information Manager (PIM), Personal Digital Assistant (PDA), laptop, camera, smartphone, tablet (such as iPad available from Apple Inc) or other suitable mobile platform or apparatus that is capable of creating an augmented reality (AR) environment.

A mobile device 401 of the type described above may include other position determination methods such as object recognition using "computer vision" techniques. The mobile device 401 may also include a user interface for selecting a portion of an image to be subject to OCR, responsive to user input on mobile device 401 e.g. by use of a touch screen therein. Mobile device 401 may include transceiver 1010, which may be an IR or RF transmitter or a wireless a transmitter enabled to transmit one or more signals over one or more types of wireless communication networks such as the Internet, WiFi, cellular wireless network or other network, e.g. for use in receiving a word dictionary from a server computer 1015. The mobile device 401 may further include, in a user interface, a microphone and a speaker (not labeled). Of course, mobile device 401 may include other elements unrelated to the present disclosure, such as a read-only-memory 1007 which may be used to store firmware for use by processor 404.

Also, depending on the embodiment, a mobile device 401 may detect words of text in images, in implementations that operate the OCR module 614 to identify, e.g. characters of Devanagiri alphabet in an image. Specifically, mobile device 401 may include in memory 501 software 510 in the form of an MSER module 610 (FIG. 6) with instructions to processor 404 to perform the above-described operation 210, a character decoder 620 (FIG. 6) with instructions to processor 404 to perform operation 220, a word decoder 630 (FIG. 6) with instructions to processor 404 to perform operation 230, etc. Word decoder 630 may include a character sequence decoder 631 (FIG. 6) that performs act 231. Moreover, OCR module 614 may include a modifier checker 640 (FIG. 6) that performs operation 240 to implement feedback. One or more of MSER module 610, character decoder 620, word decoder 630, and modifier checker 640 may be implemented in software (executed by one or more processors or processor cores) or in hardware or in firmware, or in any combination thereof, depending on the embodiment.

As noted above, in some embodiments of mobile device 401, functionality in the above-described OCR module 614 is implemented by processor 404 executing the software 510 in memory 501 of mobile device 401, although in other embodiments such functionality is implemented in any combination of hardware circuitry and/or firmware and/or software in mobile device 401. Hence, depending on the embodiment, various functions of the type described herein may be implemented in software (executed by one or more processors or processor cores) or in dedicated hardware circuitry or in firmware, or in any combination thereof.

Accordingly, depending on the embodiment, any one or more of OCR module 614 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of non-transitory computer storage medium, including long term, short term, or other memory associated with the mobile platform, and is not to be limited to any particular type of memory or number of memories, or upon which memory is stored.

Hence, methodologies described herein may be implemented by various means depending upon the application. For example, these methodologies may be implemented in firmware 1013 (FIG. 6) or software 510, or hardware 1012 or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

At least one non-transitory computer readable storage media tangibly embodying software instructions (also called "computer instructions") may be used in implementing the methodologies described herein. For example, software 510 (FIG. 6) may include program codes stored in memory 501 and executed by processor 404. Such a memory may be implemented within or external to processor 404. If implemented in firmware and/or software, the functions may be stored as one or more instructions or code on a computer readable medium. Examples include non-transitory computer readable storage media encoded with a data structure and non-transitory computer readable storage media encoded with a computer program.

Non-transitory computer readable media includes physical computer storage media. A storage medium may be any available non-transitory medium that can be accessed by a computer. By way of example, and not limitation, such non-transitory computer readable media can comprise RAM, ROM, Flash Memory, EEPROM, CD-ROM or other optical disk storage, magnetic disk storage or other magnetic storage devices, or any other non-transitory medium that can be used to store program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Hence, although mobile device 401 shown in FIG. 6 of some embodiments is a smartphone, in other embodiments the mobile device 401 is implemented by use of form factors that are different, e.g. in certain other embodiments item 401 is a mobile platform (such as a tablet, e.g. iPad available from Apple, Inc.) while in still other embodiments, the mobile device 401 is any electronic device or system. Illustrative embodiments of such an electronic device or system may include multiple physical parts that intercommunicate wirelessly, such as a processor and a memory that are portions of a stationary computer, such as a lap-top computer, a desk-top computer, or a server computer 1015 communicating over one or more wireless link(s)

with sensors and user input circuitry enclosed in a housing that is small enough to be held in a hand.

Depending on a specific symbol recognized in a handheld camera captured image, a user can receive different types of feedback depending on the embodiment. Additionally haptic feedback (e.g. by vibration of mobile device 401) is provided by triggering haptic feedback circuitry 1018 (FIG. 6) in some embodiments, to provide feedback to the user when text is recognized in an image. Instead of the just-described haptic feedback, audio feedback may be provided via a speaker in mobile device 401, in other embodiments.

Some embodiments of the type described herein use at least one non-transitory computer readable storage media such as memory 501 comprising a plurality of instructions (such as software 510) to be executed by processor 404. Such a plurality of instructions include: first instructions to receive an image (such as image 107) of a scene of real world captured by a camera 405 of mobile device 401; second instructions to identify in the image (or in a portion thereof), a plurality of characters of a predetermined script (e.g. Devanagari) in which a predetermined language (e.g. Hindi) is expressed; third instructions to select a specific sequence of characters (e.g. specific sequence 276) from a predetermined set of sequences 271, based on the specific sequence of characters matching the plurality of characters that have been identified; fourth instructions to check the image, whether at least one pixel satisfies a predetermined test associated with the specific sequence of characters; fifth instructions to add a modifier to a specific character in the specific sequence of characters, when the predetermined test is satisfied; sixth instructions to store in a memory a result of executing the instructions to add; and seventh instructions to determine a predetermined test based on the specific sequence of characters.

The above-described second instructions, when executed by one or more processors may constitute means for identifying in the image, a plurality of characters, in some embodiments. The above-described third instructions, when executed by one or more processors may constitute means for selecting a specific sequence of characters in some embodiments. The above-described fourth instructions, when executed by one or more processors may constitute means for checking whether at least one pixel satisfies a predetermined test, in some embodiments. The just described fourth instructions may include instructions to determine a center of mass of a group of pixels including the at least one pixel (which when executed by one or more processors may constitute means for determining) in some embodiments. Moreover, the above-described fifth instructions, when executed by one or more processors may constitute means for adding a modifier, in some embodiments. Certain embodiments of the storage media additionally include a group of instructions to further check for presence of a line of pixels of a common binary value in a region comprising the plurality of characters (which when executed by one or more processors may constitute means for further checking).

Various adaptations and modifications may be made without departing from the scope of the described embodiments. Numerous modifications and adaptations of the embodiments described herein are encompassed by the attached claims.

The invention claimed is:

1. A method to decode text in real world images, the method comprising:
receiving a natural image of a scene of real world captured by a camera of a mobile device, the natural image comprising text pixels in one or more text regions and further comprising non-text pixels;
detecting in the natural image, a text region comprising a first sequence of characters of a predetermined script in which a predetermined language is expressed;
selecting a second sequence of characters from a predetermined set of sequences, based on the second sequence of characters matching the first sequence of characters, wherein at least one of the sequences in the predetermined set is associated with information on location of one or more modifiers;
after the selecting and responsive to the second sequence being associated with the information, analyzing the natural image to determine whether at least one pixel satisfies a predetermined test associated with said information;
adding a modifier to a specific character in a copy of the second sequence of characters, when the predetermined test is satisfied; and
identifying said first sequence of characters detected in said text region, as a word in the predetermined language comprising the copy of said second sequence of characters with the modifier;
wherein one or more of the receiving, the detecting, the selecting, the analyzing, the adding, and the identifying are performed by at least one processor coupled to a memory.

2. The method of claim 1 further comprising:
checking for presence of a line of pixels of a common binary value in the text region comprising the first sequence of characters.

3. The method of claim 2 wherein:
the at least one pixel is checked for location in the natural image above the line of pixels, when a longitudinal direction of a bounding box of the text region is horizontal.

4. The method of claim 3 wherein:
the predetermined script is Devanagari;
the line of pixels is comprised in a shiro-rekha of the word formed by the first sequence of characters; and
the at least one pixel in the natural image is comprised in a group of pixels that correspond to a vowel maatra located to a right side of the text region, when the longitudinal direction of the text region is horizontal.

5. The method of claim 4 wherein:
the vowel maatra is one of matraas ा  ो or ो .

6. The method of claim 2 wherein:
the predetermined script is Devanagari;
the line of pixels is comprised in a shiro-rekha of the word formed by the first sequence of characters; and the predetermined test identifies a DOT maatra ं located above the shiro-rekha.

7. The method of claim 1 wherein:
the checking comprises determining a center of mass of a group of pixels including the at least one pixel.

8. The method of claim 1 further comprising:
determining the predetermined test based on the second sequence of characters; and
storing in the memory the second sequence of characters as another word recognized in the predetermined language, when the second sequence of characters is found to be not associated with any test, by the determining.

9. At least one non-transitory computer readable storage media comprising a plurality of instructions to be executed by at least one processor to decode text in real world images, the plurality of instructions comprising:

first instructions to receive a natural image of a scene of real world captured by a camera of a mobile device, the natural image comprising text pixels in one or more text regions and further comprising non-text pixels;

second instructions to detect in the natural image, a text region comprising a first sequence of characters of a predetermined script in which a predetermined language is expressed;

third instructions to select a second sequence of characters from a predetermined set of sequences, based on the second sequence of characters matching the first sequence of characters, wherein at least one of the sequences in the predetermined set is associated with information on location of one or more modifiers;

fourth instructions, to be executed after the third instructions and responsive to the second sequence being associated with the information, to analyze the natural image to determine whether at least one pixel satisfies a predetermined test associated with said information;

fifth instructions to add a modifier to a specific character in a copy of the second sequence of characters, when the predetermined test is satisfied; and sixth instructions to identify said first sequence of characters detected in said text region, as a word in the predetermined language comprising the copy of said second sequence of characters with the modifier.

10. The at least one non-transitory computer readable storage media of claim 9 wherein the plurality of instructions further comprises:
a group of instructions to further check for presence of a line of pixels of a common binary value in a text region comprising the first sequence of characters.

11. The at least one non-transitory computer readable storage media of claim 10 wherein:
the at least one pixel is checked for location in the natural image above the line of pixels, when a longitudinal direction of a bounding box of the text region is horizontal.

12. The at least one non-transitory computer readable storage media of claim 11 wherein:
the predetermined script is Devanagari;
the line of pixels is comprised in a shiro-rekha of the word; and
the at least one pixel is comprised in a group of pixels that correspond to a vowel maatra located to a right side of the bounding box, when the longitudinal direction of the bounding box is horizontal.

13. The at least one non-transitory computer readable storage media of claim 12 wherein:
the vowel maatra is one of matraas ों, ों or ों.

14. The at least one non-transitory computer readable storage media of claim 10 wherein:
the predetermined script is Devanagari;
the line of pixels is comprised in a shiro-rekha of the word; and
the predetermined test identifies a DOT maatra ं located above the shiro-rekha.

15. The at least one non-transitory computer readable storage media of claim 9 wherein:
the fourth instructions, when executed determining a center of mass of a group of pixels including the at least one pixel.

16. The at least one non-transitory computer readable storage media of claim 9 wherein the plurality of instructions further comprises:

seventh instructions to determine the predetermined test based on the second sequence of characters;
wherein the second sequence of characters is stored as another word recognized in the predetermined language, when the second sequence of characters is found to be not associated with any test, by execution of the seventh instructions.

17. A mobile device to decode text in real world images, the mobile device comprising:
a camera;
a memory operatively connected to the camera to receive at least a natural image of a scene therefrom, the natural image comprising text pixels in one or more text regions and further comprising non-text pixels;
at least one processor operatively connected to the memory to execute a plurality of instructions stored in the memory;
wherein the plurality of instructions cause the at least one processor to:
detect in the natural image, a text region comprising a first sequence of characters of a predetermined script in which a predetermined language is expressed;
select a second sequence of characters from a predetermined set of sequences, based on the second sequence of characters matching the first sequence of characters, wherein at least one of the sequences in the predetermined set is associated with information on location of one or more modifiers;
after selection of the second sequence of characters and responsive to the second sequence being associated with the information, analyzing the natural image to determine whether at least one pixel satisfies a predetermined test associated with said information;
add a modifier to a specific character in a copy of the second sequence of characters, when the predetermined test is satisfied; and
identify said first sequence of characters detected in said text region, as a word in the predetermined language comprising the copy of said second sequence of characters with the modifier.

18. The mobile device of claim 17 wherein the at least one processor is further configured to:
further check for presence of a line of pixels of a common binary value in a text region comprising the first sequence of characters.

19. The mobile device of claim 18 wherein:
the at least one pixel is checked for location above the line of pixels, when a longitudinal direction of a bounding box of the text region is horizontal.

20. The mobile device of claim 19 wherein:
the predetermined script is Devanagari;
the line of pixels is comprised in a shiro-rekha of the word; and
the at least one pixel is comprised in a group of pixels that correspond to a vowel maatra located to a right side of the bounding box, when the longitudinal direction of the bounding box is horizontal.

21. The mobile device of claim 18 wherein:
the predetermined script is Devanagari;
the line of pixels is comprised in a shiro-rekha of the word; and
the predetermined test identifies a DOT maatra ं located above the shiro-rekha.

22. The mobile device of claim 17 wherein the at least one processor is configured to:

determine a center of mass of a group of pixels including the at least one pixel.

23. An apparatus to decode text in real world images, the apparatus comprising:

a memory storing a natural image of a scene outside the apparatus, the natural image comprising text pixels in one or more text regions and further comprising non-text pixels;

means for detecting in the natural image, a text region comprising a first sequence of characters of a predetermined script in which a predetermined language is expressed;

means for selecting a second sequence of characters from a predetermined set of sequences, based on the second sequence of characters matching the first sequence of characters, wherein at least one of the sequences in the predetermined set is associated with information on location of one or more modifiers;

means, operable after the means for selecting and responsive to the second sequence being associated with the information, for analyzing the natural image to determine whether at least one pixel satisfies a predetermined test associated with said information;

means for adding a modifier to a specific character in a copy of the second sequence of characters, when the predetermined test is satisfied; and means for identifying said first sequence of characters detected in said text region, as a word in the predetermined language comprising the copy of said second sequence of characters with the modifier.

24. The apparatus of claim 23 further comprising:
means for further checking for presence of a line of pixels of a common binary value in the text region comprising the first sequence of characters.

25. The apparatus of claim 24 wherein:
the at least one pixel is checked for location in the natural image above the line of pixels, when a longitudinal direction of a bounding box of the text region is horizontal.

26. The apparatus of claim 25 wherein:
the predetermined script is Devanagari;
the line of pixels is comprised in a shiro-rekha of the word; and
the at least one pixel is comprised in a group of pixels that correspond to a vowel maatra located to a right side of the bounding box, when the longitudinal direction of the bounding box is horizontal.

27. The apparatus of claim 26 wherein:
the vowel maatra is one of matraas .

28. The apparatus of claim 24 wherein:
the predetermined script is Devanagari;
the line of pixels is comprised in a shiro-rekha of the word; and
the predetermined test identifies a DOT maatra ं located above the shiro-rekha.

29. The apparatus of claim 23 further comprising:
means for determining a center of mass of a group of pixels including the at least one pixel.

* * * * *

UNITED STATES PATENT AND TRADEMARK OFFICE
CERTIFICATE OF CORRECTION

PATENT NO. : 9,262,699 B2
APPLICATION NO. : 13/828060
DATED : February 16, 2016
INVENTOR(S) : Kishor K. Barman et al.

Page 1 of 1

It is certified that error appears in the above-identified patent and that said Letters Patent is hereby corrected as shown below:

In the claims,

In column 24, line 46, in claim 5, that portion of the claim reading " ী ীী or ী " should read -- ো ী or ী --.

In column 25, line 51, in claim 13, that portion of the claim reading " ী ীী or ী " should read -- ো ী or ী --.

In column 28, line 19, in claim 27, that portion of the claim reading " ী ীী or ী " should read -- ো ী or ী --.

Signed and Sealed this
Sixteenth Day of August, 2016

Michelle K. Lee
*Director of the United States Patent and Trademark Office*